US012627853B2

(12) United States Patent
Narayanan et al.

(10) Patent No.: US 12,627,853 B2
(45) Date of Patent: May 12, 2026

(54) CONSOLE INFORMATION RECORDING DONGLE SYSTEM

(71) Applicant: Dell Products L.P., Round Rock, TX (US)

(72) Inventors: Padmanabhan Narayanan, Chennai (IN); Kumarapuram Parameswaran Balasubramanian, Chennai (IN); Vamshidhar Varre, Hyderabad (IN)

(73) Assignee: Dell Products L.P., Round Rock, TX (US)

( * ) Notice: Subject to any disclaimer, the term of this patent is extended or adjusted under 35 U.S.C. 154(b) by 124 days.

(21) Appl. No.: 18/655,416

(22) Filed: May 6, 2024

(65) Prior Publication Data

US 2025/0343965 A1 Nov. 6, 2025

(51) Int. Cl.
*H04N 21/433* (2011.01)
*H01R 24/64* (2011.01)

(52) U.S. Cl.
CPC ......... *H04N 21/4334* (2013.01); *H01R 24/64* (2013.01); *H01R 2201/04* (2013.01)

(58) Field of Classification Search
CPC . H04N 21/4334; H01R 24/64; H01R 2201/04
See application file for complete search history.

(56) References Cited

U.S. PATENT DOCUMENTS

| | | | | |
|---|---|---|---|---|
| 2002/0188709 | A1* | 12/2002 | McGraw | ................. H04L 67/30 709/223 |
| 2006/0242401 | A1* | 10/2006 | Elliger | ................ H04L 63/0236 713/2 |
| 2007/0038739 | A1* | 2/2007 | Tucker | .................. H04L 67/125 709/224 |
| 2017/0041271 | A1* | 2/2017 | Tal | ......................... G06Q 10/10 |

\* cited by examiner

*Primary Examiner* — Henry Tsai
*Assistant Examiner* — John B Roche
(74) *Attorney, Agent, or Firm* — Joseph Mencher

(57) ABSTRACT

A console information recording dongle system includes a networking device having a networking device console port, and a console information recording dongle device. The console information recording dongle device includes a dongle device console connector that is connected to the networking device console port, a storage device, and a console information recording engine that is coupled to the dongle device console connector and the storage device. The console information recording engine receives console information generated by the networking device through the dongle device console connector via the networking device console port, and stores the console information in the storage device. The console information recording dongle device may also include a dongle device console port, and may transmit the console information that was received via the dongle device console connector through the dongle device console port.

20 Claims, 26 Drawing Sheets

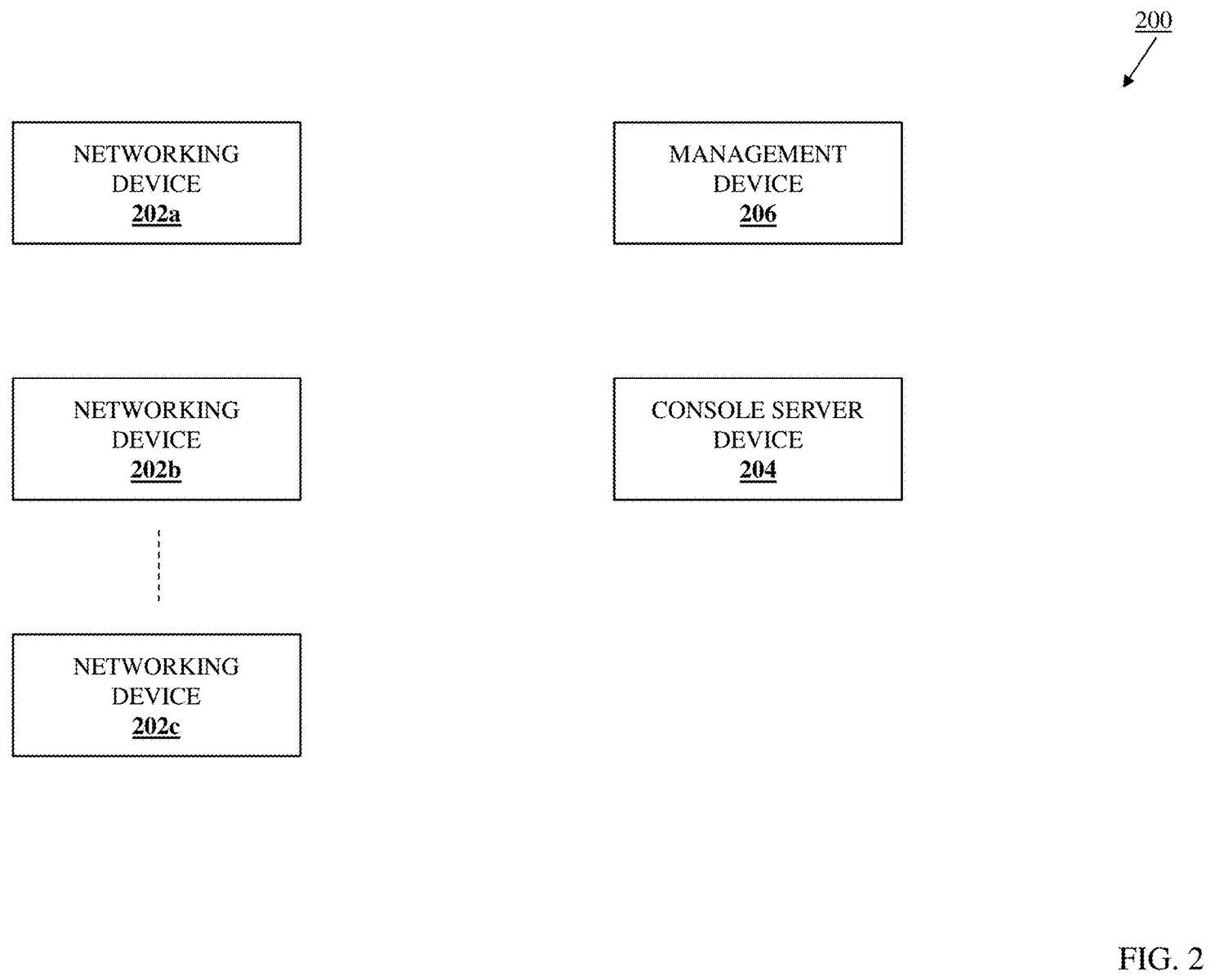

200

MANAGEMENT DEVICE 206

CONSOLE SERVER DEVICE 204

NETWORKING DEVICE 202a

NETWORKING DEVICE 202b

NETWORKING DEVICE 202c

FIG. 2

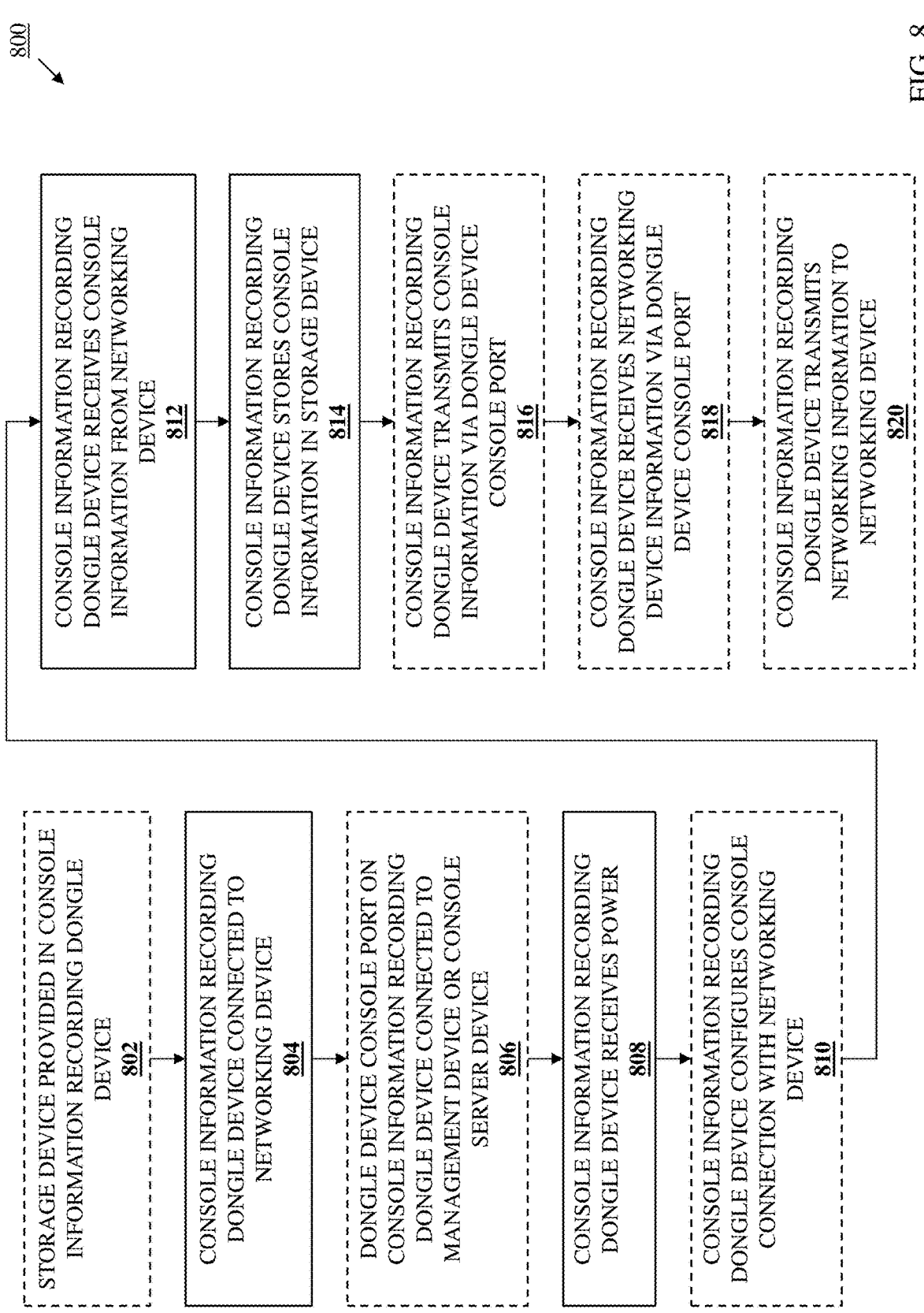

STORAGE DEVICE PROVIDED IN CONSOLE INFORMATION RECORDING DONGLE DEVICE
802

CONSOLE INFORMATION RECORDING DONGLE DEVICE CONNECTED TO NETWORKING DEVICE
804

DONGLE DEVICE CONSOLE PORT ON CONSOLE INFORMATION RECORDING DONGLE DEVICE CONNECTED TO MANAGEMENT DEVICE OR CONSOLE SERVER DEVICE
806

CONSOLE INFORMATION RECORDING DONGLE DEVICE RECEIVES POWER
808

CONSOLE INFORMATION RECORDING DONGLE DEVICE CONFIGURES CONSOLE CONNECTION WITH NETWORKING DEVICE
810

CONSOLE INFORMATION RECORDING DONGLE DEVICE RECEIVES CONSOLE INFORMATION FROM NETWORKING DEVICE
812

CONSOLE INFORMATION RECORDING DONGLE DEVICE STORES CONSOLE INFORMATION IN STORAGE DEVICE
814

CONSOLE INFORMATION RECORDING DONGLE DEVICE TRANSMITS CONSOLE INFORMATION VIA DONGLE DEVICE CONSOLE PORT
816

CONSOLE INFORMATION RECORDING DONGLE DEVICE RECEIVES NETWORKING DEVICE INFORMATION VIA DONGLE DEVICE CONSOLE PORT
818

CONSOLE INFORMATION RECORDING DONGLE DEVICE TRANSMITS NETWORKING INFORMATION TO NETWORKING DEVICE
820

CONSOLE INFORMATION RECORDING DONGLE SYSTEM

BACKGROUND

The present disclosure relates generally to information handling systems, and more particularly to a dongle device that externally connects to and records console information generated by an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices and/or other networking devices known in the art, typically include management ports that provide for the transmission of a variety of management information to and from the switch device. For example, many conventional switch devices include a pair of RJ-45 type ports that are configured to provide a serial console connection and an Out-Of-Band (OOB) Ethernet management connection, respectively, to the switch device. As will be appreciated by one of skill in the art in possession of the present disclosure, the serial console connection discussed above is often provided by directly connecting a laptop/notebook computing device to the "console" RJ-45 type port via an Ethernet cable, or coupling the "console" RJ-45 type port to a console server device via an Ethernet cable, while the OOB Ethernet management connection is often provided by coupling the "OOB Ethernet management" RJ-45 type port to an Ethernet network via an Ethernet cable. A user may then subsequently use the serial console connection to directly communicate with the switch device using the laptop/notebook computing device, or to communicate with the switch device via the console server device (e.g., using a telnet, Secure SHell (SSH), and/or other remote connection to the console server device), while using the OOB Ethernet management connection to communicate with the switch device (e.g., using telnet, SSH, and/or other remote connection to the switch device).

However, while the OOB Ethernet management connection available via the OOB Ethernet management RJ-45 type port on switch devices is required relatively often (e.g., for initial image install operations, "day 0/day 1" software provisioning, and switch orchestration and monitoring), the serial console connection available via the console RJ-45 type port on switch devices is required sparingly and on a need basis, and the inventors of the present disclosure have determined that the serial console connection available via the console RJ-45 type port on switch devices is typically unused by switch device users. For example, many switch device users (e.g., "hyperscalers", relatively large enterprises, network "edge" providers, etc.) do not use the serial console connection available via the console RJ-45 type port on switch devices due to the relatively high capital and operational expenditures that accompany console infrastructure. The failure to use the serial console connection available via the console RJ-45 type port on switch devices raises issues, as that serial console connection provides for the transmission of a variety of information that can be particularly valuable when the switch device experiences issues.

For example, situations may arise in which the OOB Ethernet management connection provided via the OOB Ethernet management RJ-45 type port becomes unavailable such as, for example, when the switch device is stuck in a Basic Input/Output System (BIOS) mode (e.g., due to storage device unavailability, memory unavailability, or other Power-on Start-Up (POST) issues that would be apparent to one of skill in the art in possession of the present disclosure), when the switch device experiences bootloader issues, when a Networking Operating System (NOS) for the switch device "hangs" or otherwise becomes unavailable during initialization (i.e., before a "system ready" point in initialization after which the OOB Ethernet management RJ-45 type port is "up" and available), when the switch device gets stuck in a continuous reboot scenario (e.g., due to kernel "panic"), and/or other OOB Ethernet management connection unavailability situations that would be apparent to one of skill in the art in possession of the present disclosure.

Furthermore, the OOB Ethernet management connection unavailability situations described above can happen quickly (e.g., within days or even hours in response to an image upgrade), and can result in fleets of switch devices becoming unresponsive, and often causes switch device users to power down the effected switch devices (e.g., while rerouting data traffic) due to the root cause of the issues being unknown. In cases where an effected switch device is not configured to save its console information (e.g., in console logs such as crash logs, reboot logs, boot up logs, etc.) and the serial console connection available via the console RJ-45 type port on the switch device is not being used, the effected switch devices must be shipped to the switch device provider for troubleshooting, and such troubleshooting will be complicated due to the lack of console information. Furthermore, even in cases where the switch device is configured to save its console information, the effected switch devices still must be shipped to the switch device provider so that console information may be extracted to perform troubleshooting, as that console information is unavailable via the serial console connection and will be inaccessible due to the unavailable OOB Ethernet management connection and/or the inability to initialize the switch device.

Accordingly, it would be desirable to provide a console information access system that addresses the issues discussed above.

SUMMARY

According to one embodiment, an Information Handling System (IHS) includes a dongle chassis; a dongle device console connector that is included on the dongle chassis and that is configured to connect to a networking device console port; a storage device connector that is included on the dongle chassis and that is configure to connect to a storage device; a processing system that is housed in the dongle chassis and that is coupled to the dongle device console connector and the storage device connector; and a memory system that is coupled to the processing system and that includes instructions that, when executed by the processing system, cause the processing system to provide a console information recording engine that is configured to: receive, via the dongle device console connector, console information generated by a networking device when the dongle device console connector is connected to the networking device console port; and store the console information in a storage device that is connected to the storage device connector.

BRIEF DESCRIPTION OF THE DRAWINGS

FIG. 2 is a schematic view illustrating an embodiment of a networked system that may provide the console information recording dongle system of the present disclosure.

FIG. 8 is a flow chart illustrating an embodiment of a method for recording console information from a computing device using a dongle device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
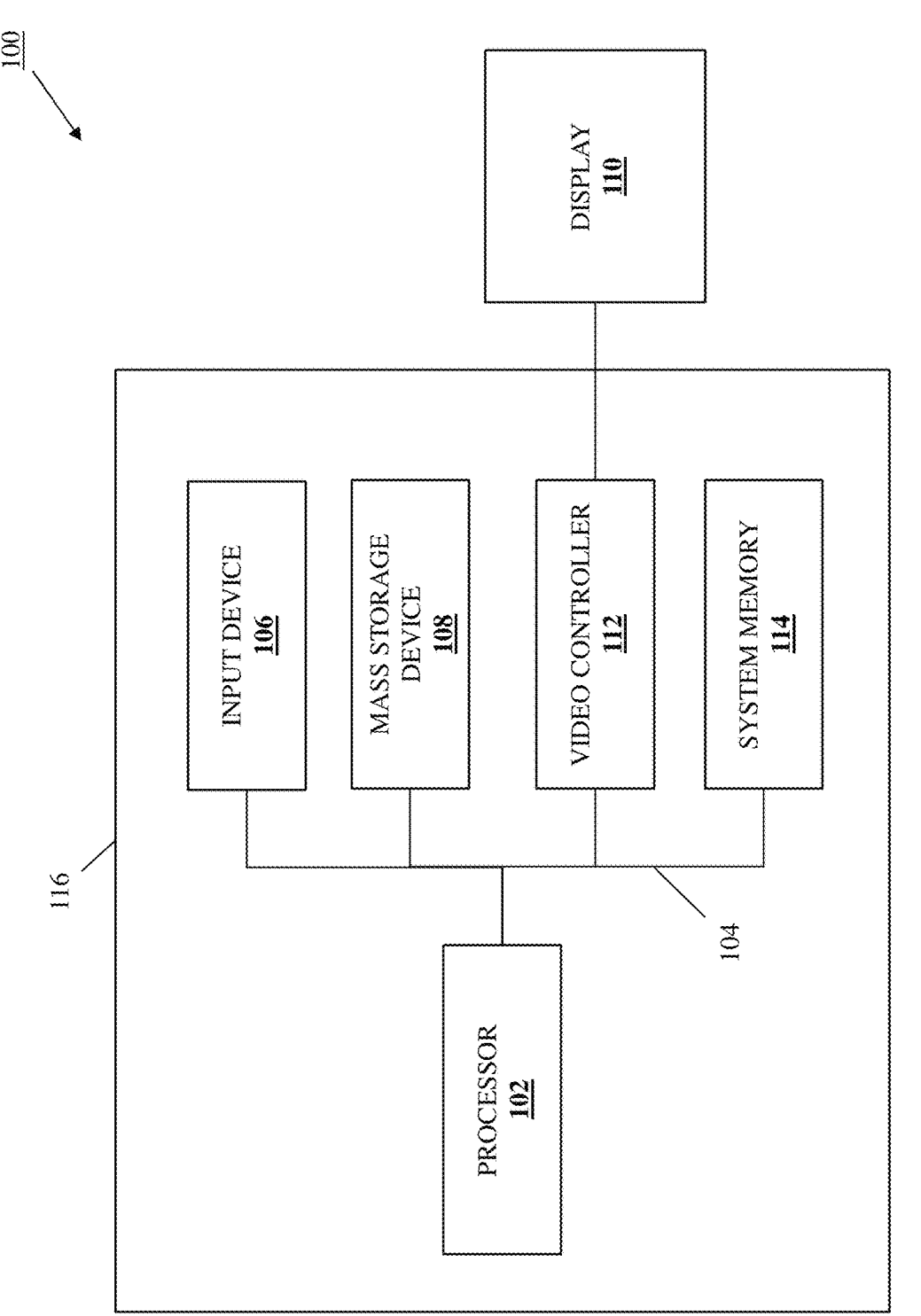
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Referring now to FIG. 2, an embodiment of a networked system 200 is illustrated that may provide the console information recording dongle system of the present disclosure. In the illustrated embodiment, the networked system 200 includes a plurality of networking devices 202*a*, 202*b*, and up to 202*c*. In an embodiment, any or each of the networking device 202*a*-202*c* may be provided by the IHS 100 discussed above with reference to FIG. 1, and/or may include some or all of the components of the IHS 100, and in specific examples may be provided by switch devices. However, while illustrated and discussed as being provided by networking devices such as switch devices, one of skill in the art in possession of the present disclosure will recognize that the networking devices provided in the networked system 200 described below may be replaced by other devices (e.g., storage systems, server devices, other computing devices) that may be configured to operate similarly as the networking devices 202*a*-202*c* discussed below.

In the illustrated embodiment, the networked system 200 may also include a console server device 204 that, as described below, may be coupled (or is configured to be coupled) to any or all of the networking devices 202*a*-202*c*. In an embodiment, the console server device 204 may be provided by the IHS 100 discussed above with reference to FIG. 1, and/or may include some or all of the components of the IHS 100. However, while illustrated and discussed as being provided by a console server device, one of skill in the art in possession of the present disclosure will recognize that console server devices provided in the networked system 200 described below may be provided by other devices that may be configured to operate similarly as the console server device 204 discussed below. Furthermore, as discussed below, some embodiments of the present disclosure may not utilize the console server device 204.

In the illustrated embodiment, the networked system 200 may also include a management device 206 that, as described below, may be coupled (or is configured to be coupled) to any of the networking devices 202*a*-202*c*. In an embodiment, the management device 206 may be provided by the IHS 100 discussed above with reference to FIG. 1, and/or may include some or all of the components of the IHS 100, and in specific examples may be provided by laptop/ notebook computing devices. However, while illustrated and discussed as being provided by particular management devices, one of skill in the art in possession of the present disclosure will recognize that management devices provided in the networked system 200 described below may be provided by other devices that may be configured to operate similarly as the management device 206 discussed below. Furthermore, as discussed below, some embodiments of the present disclosure may not utilize the management device 206. However, while a specific networked system 200 has been illustrated and described, one of skill in the art in possession of the present disclosure will recognize that the networked system of the present disclosure may include a variety of components and component configurations while remaining within the scope of the present disclosure as well.

Figure 3:
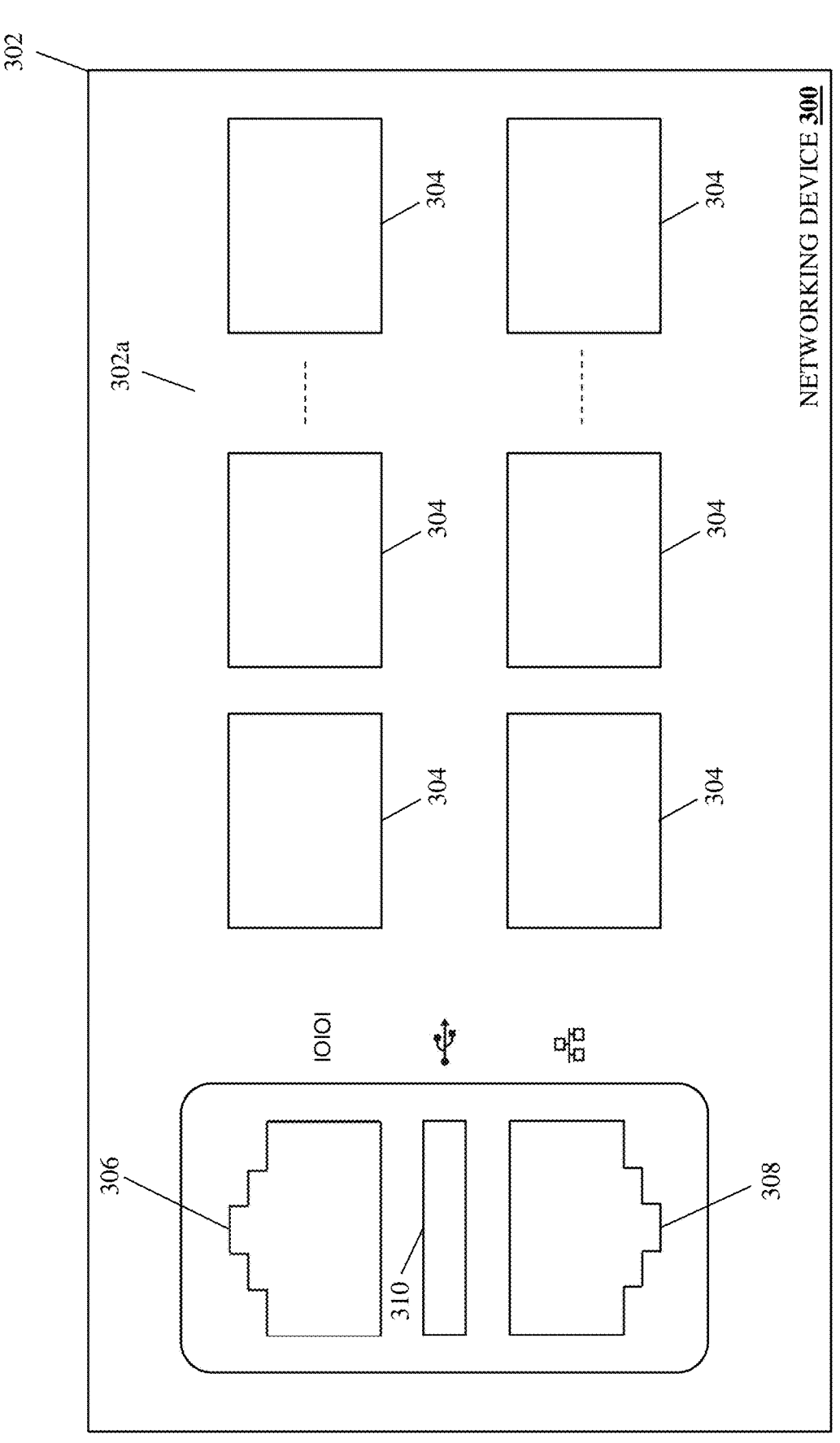
FIG. 3 is a schematic view illustrating an embodiment of a networking device that may be included in the networked system of FIG. 2.

Referring now to FIG. 3, an embodiment of a networking device 300 is illustrated that may provide any of the networking devices 202*a*-202*c* discussed above with reference to FIG. 2. As such, the networking device 300 may be provided by the IHS 100 discussed above with reference to FIG. 1 and/or may include some or all of the components of the IHS 100, and in specific examples may be provided by a switch device. However, while illustrated and discussed as being provided by networking devices such as switch devices, one of skill in the art in possession of the present disclosure will recognize that the functionality of the networking device 300 discussed below may be provided by other devices that are configured to operate similarly as the networking device 300 discussed below.

In the illustrated embodiment, the networking device 300 includes a chassis 302 that houses the components of the networking device 300, only some of which are illustrated and described below. In the illustrated embodiment, the chassis 302 includes a front surface 302*a*, and a plurality of networking device networking ports 304 are accessible on the front surface 302*a* of the chassis 302 and are configured to be coupled to other devices (e.g., server devices, storage systems, other networking devices, etc.) via networking cables to transmit data with those other devices.

Furthermore, a plurality of networking device management ports are accessible on the front surface 302*a* of the chassis 302 adjacent the networking ports 304, and in the specific example illustrated in FIG. 3 include a networking device console port 306 and an Out-Of-Band (OOB) Ethernet management port 308. Similarly as described above, the networking device console port 306 is conventionally utilized to provide a serial console connection that enables direct communication with the networking device 300 using the management device 206 (e.g., via an Ethernet cable connected to the management device 206 and the networking device console port 306), or to communicate with the networking device 300 via the console server device 204 (e.g., via an Ethernet cable connected to the console server device 204 and the networking device console port 306 and using a telnet, SSH, and/or other remote connection to the console server device) 204, while the OOB Ethernet management port 308 is conventionally utilized to provide an OOB Ethernet management connection that enables communication with the networking device 300 (e.g., via an Ethernet cable connected to the OOB Ethernet management port 308 and a network and using a telnet, SSH, and/or other remote connection to the networking device 300).

As will be appreciated by one of skill in the art in possession of the present disclosure, the networking device console port 306 and the OOB Ethernet management port 308 are illustrated and described below as being provided by Registered Jack 45 (RJ-45) type ports, but one of skill in the art in possession of the present disclosure will appreciate how the networking device console port 306 and/or the OOB Ethernet management port 308 may be provided by other types of ports while remaining within the scope of the present disclosure as well.

A networking device power port 310 is accessible on the front surface 302a of the chassis 302 adjacent the networking ports 304 and between the networking device console port 306 and the OOB Ethernet management port 308, and in the specific example illustrated in FIG. 3 is provided by a Universal Serial Bus (USB)-A type port. However, while illustrated and described as being provided by a USB type port located between the networking device management ports, one of skill in the art in possession of the present disclosure, one of skill in the art in possession of the present disclosure will appreciate how the networking device power port on a networking device may be provided by a variety of different types of power ports and/or may be provided in a variety of other locations on the networking device while remaining within the scope of the present disclosure as well.

Figure 4:
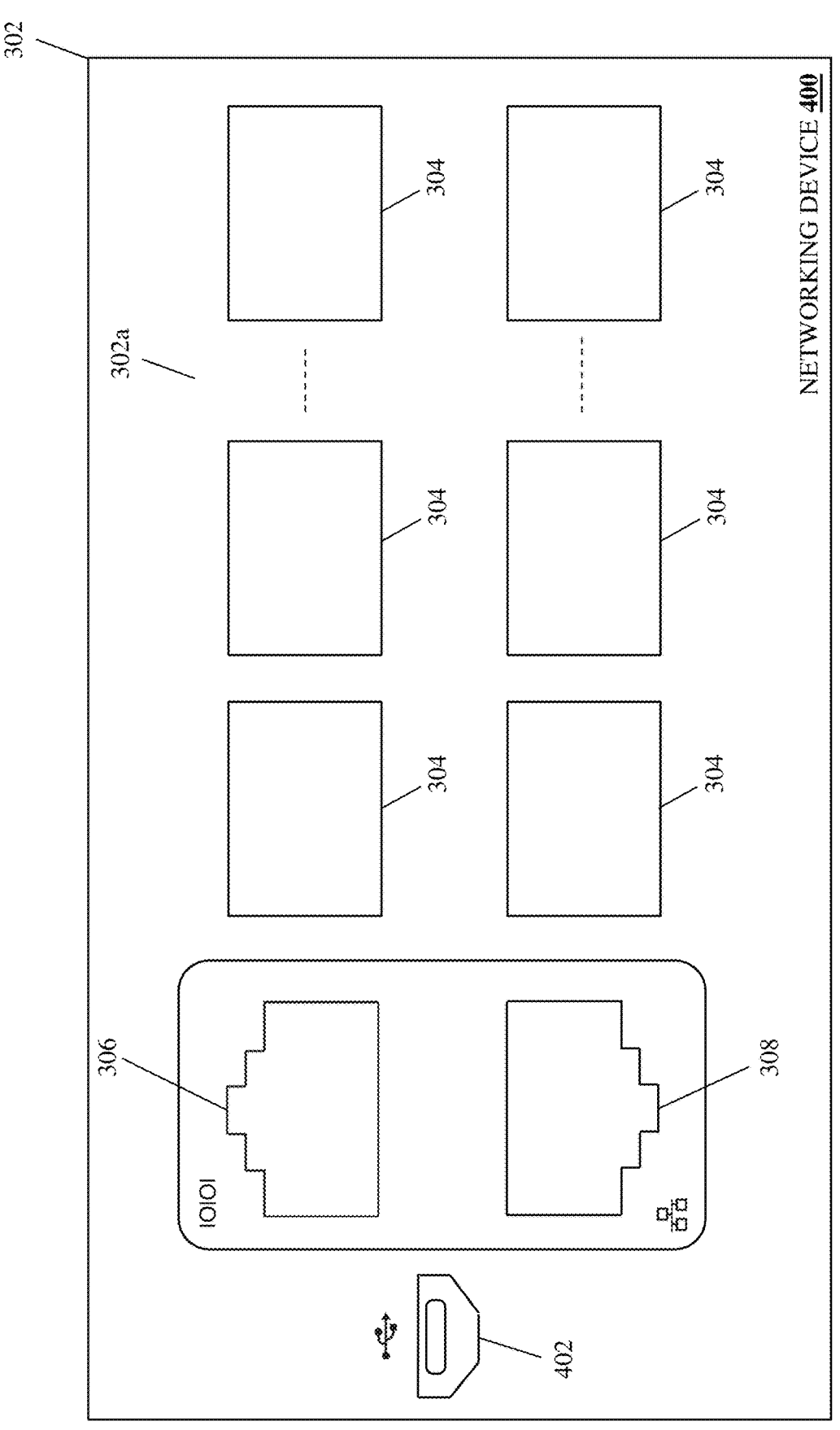
FIG. 4 is a schematic view illustrating an embodiment of a networking device that may be included in the networked system of FIG. 2.

For example, with reference to FIG. 4, a networking device 400 is illustrated that is substantially similar to the networking device 300 discussed above with reference to FIG. 3 and thus includes similar element numbers for similar components. However, the networking device 400 includes a networking device power port 402 that replaces the networking device power port 310 on the networking device 300 (via a micro-USB/USB-B type port that replaces the USB-A type port in this example), and one of skill in the art in possession of the present disclosure will appreciate how the networking device power port 402 on the networking device 400 is moved relative to the networking device power port 310 on the networking device 300 such that it is not located between the networking device console port 306 and the OOB Ethernet management port 308, and rather is located opposite the networking device console port 306 and the OOB Ethernet management port 308 from the networking device networking ports 304. As such, one of skill in the art in possession of the present disclosure will appreciate how a variety of networking device power port locations on networking devices will fall within the scope of the present disclosure.

Furthermore, while specific networking devices 300 and 400 have been illustrated and described, one of skill in the art in possession of the present disclosure will recognize that networking devices (or other devices operating according to the teachings of the present disclosure in a manner similar to that described below for the networking devices 300 and 400) may include a variety of components and/or component configurations for providing conventional networking device functionality, as well as the console information recording dongle functionality discussed below, while remaining within the scope of the present disclosure as well.

Figure 5:
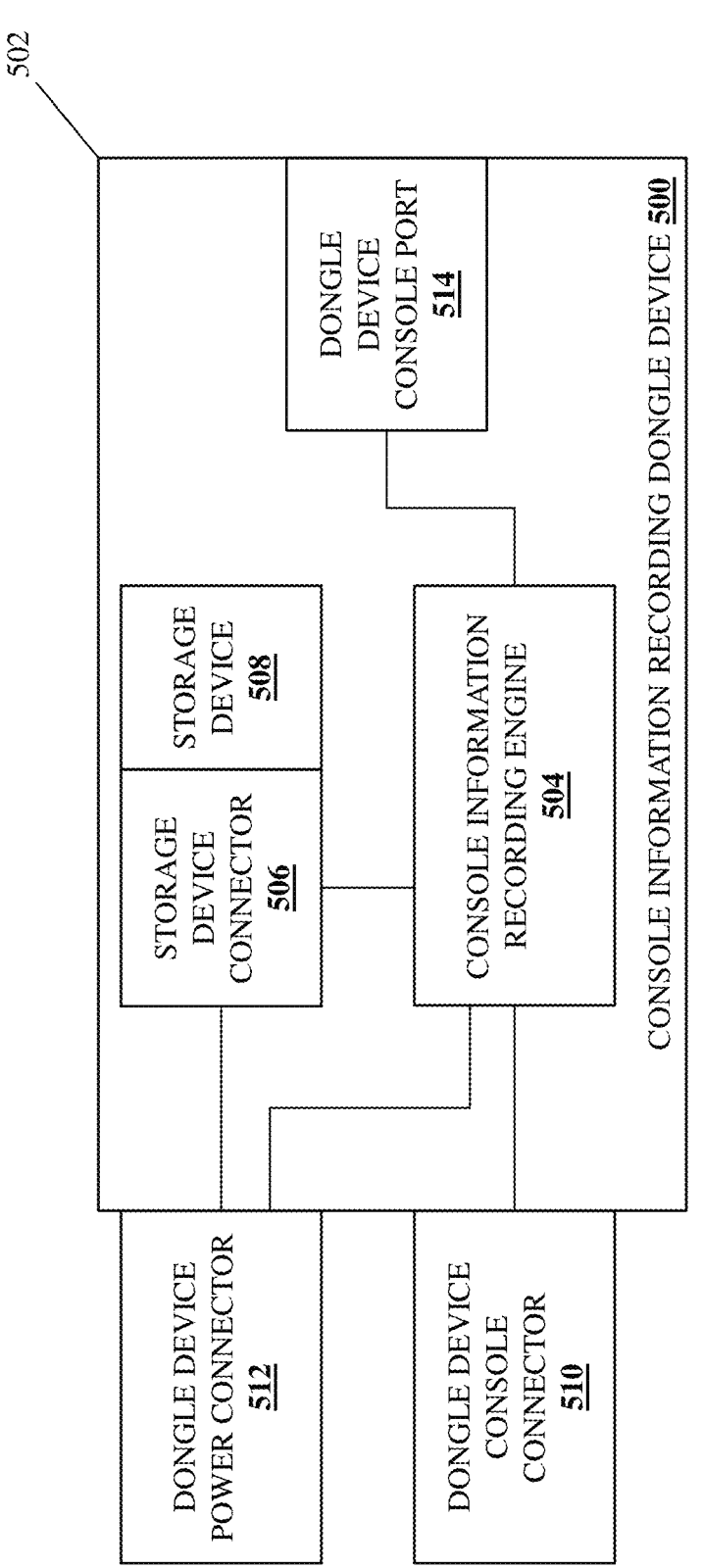
FIG. 5 is a schematic view illustrating an embodiment of a console information recording dongle device that may be provided in the networked system of FIG. 2 and used with the networking devices of FIGS. 3 and 4.

Referring now to FIG. 5, an embodiment of a console information recording dongle device 500 is illustrated that may be provided in the networked system 200 of FIG. 2 and used with the networking devices 300 and 400 of FIGS. 3 and 4. In an embodiment, the console information recording dongle device 500 may be provided by the IHS 100 discussed above with reference to FIG. 1 and/or may include some or all of the components of the IHS 100, and one of skill in the art in possession of the present disclosure will appreciate how the console information recording dongle device 500 may be provided in any of a variety of dongle form-factors known in the art. Furthermore, while illustrated and discussed as being provided by a dongle device, one of skill in the art in possession of the present disclosure will recognize that the functionality of the console information recording dongle device 500 discussed below may be integrated into the networking devices (or other devices) discussed below in some embodiments of the present disclosure while remaining within its scope as well.

In the illustrated embodiment, the console information recording dongle device 500 includes a dongle chassis 502 that houses the components of the console information recording dongle device 500, only some of which are illustrated and described below. For example, the dongle chassis 502 may house a processing system (not illustrated, but which may be similar to the processor 102 discussed above with reference to FIG. 1) and a memory system (not illustrated, but which may be similar to the memory 114 discussed above with reference to FIG. 1) that is coupled to the processing system and that includes instructions that, when executed by the processing system, cause the processing system to provide a console information recording engine 504 that is configured to perform the functionality of the console information recording engines and/or console information recording dongle devices discussed below.

In the illustrated embodiment, the dongle chassis 502 also includes a storage device connector 506 that is connected to the console information recording engine 504 (e.g., via a coupling between the storage device connector 506 and the processing system) and that is illustrated in FIG. 5 as being connected to a storage device 508. As will be appreciated by one of skill in the art in possession of the present disclosure, in the specific examples provided below, the storage device connector 506 is illustrated and described as being provided by a Micro Secure Digital (MicroSD) card connector (or other removable storage device connector) that is configured to connect to and disconnect from a MicroSD card or other removable storage device that provides the storage device 508, but one of skill in the art in possession of the present disclosure will appreciate how the storage device 508 may be integrated in the console information recording dongle device 500 (i.e., not easily disconnected from the storage device connector 506 and removeable from the dongle chassis 502 without opening up the dongle chassis 502 with the use of a tool) while remaining within the scope of the present disclosure as well.

A dongle device console connector 510 is also included on the dongle chassis 502 and coupled to the console information recording engine 504 (e.g., via a coupling between the dongle device console connector 510 and the processing system). As will be appreciated by one of skill in the art in possession of the present disclosure, the dongle device console connector 510 is illustrated and described below as being provided by an RJ-45 type connector, but one of skill in the art in possession of the present disclosure will appreciate how the dongle device console connector 510 may be provided by other types of connectors while remaining within the scope of the present disclosure as well. Furthermore, one of skill in the art in possession of the present disclosure will appreciate how the console information recording engine 504 and/or dongle device console connector 510 may include, be coupled together by, and/or otherwise utilize a Universal Asynchronous Receiver-Transmitter (UART) (e.g., as a "stand-alone" component, integrated in the processing system that provides the console information recording engine 504, etc.) for use in performing the serial communications described herein with the networking device via its networking device console port.

In the illustrated embodiment, a dongle device power connector 512 is also included on the dongle chassis 502 and coupled to the console information recording engine 504 (e.g., via a coupling between the dongle device power connector 512 and the processing system) and the storage device connector 506. As will be appreciated by one of skill in the art in possession of the present disclosure, the dongle device power connector 512 is illustrated and described below as being provided by an USB type connector, but one of skill in the art in possession of the present disclosure will appreciate how the dongle device power connector 512 may be provided by other types of connectors while remaining within the scope of the present disclosure as well. Furthermore, while illustrated and described below as receiving external power via the dongle device power connector 512, one of skill in the art in possession of the present disclosure will appreciate how in other embodiments the console information recording dongle device 500 may include internal power via a battery system or other internal power sources known in the art while remaining within the scope of the present disclosure as well.

In the illustrated embodiment, a dongle device console port 514 is also included on the dongle chassis 502 and coupled to the console information recording engine 504 (e.g., via a coupling between the dongle device console port 514 and the processing system). As will be appreciated by one of skill in the art in possession of the present disclosure, the dongle device console port 514 is illustrated and described below as being provided by an RJ-45 type port, but one of skill in the art in possession of the present disclosure will appreciate how the dongle device console port 514 may be provided by other types of connectors while remaining within the scope of the present disclosure as well. Furthermore, one of skill in the art in possession of the present disclosure will appreciate how the console information recording engine 504 and/or dongle device console port 514 may include, be coupled together by, and/or otherwise utilize a UART (e.g., as a "stand-alone" component, integrated in the processing system that provides the console information recording engine 504, etc.) for use in performing the serial communications described herein via dongle device console port 514.

However, while a specific console information recording dongle device 500 has been illustrated and described, one of skill in the art in possession of the present disclosure will recognize that console information recording dongle devices (or other devices operating according to the teachings of the present disclosure in a manner similar to that described below for the console information recording dongle device 500) may include a variety of components and/or component configurations for providing conventional functionality, as well as the console information recording functionality discussed below, while remaining within the scope of the present disclosure as well.

Figure 6A:
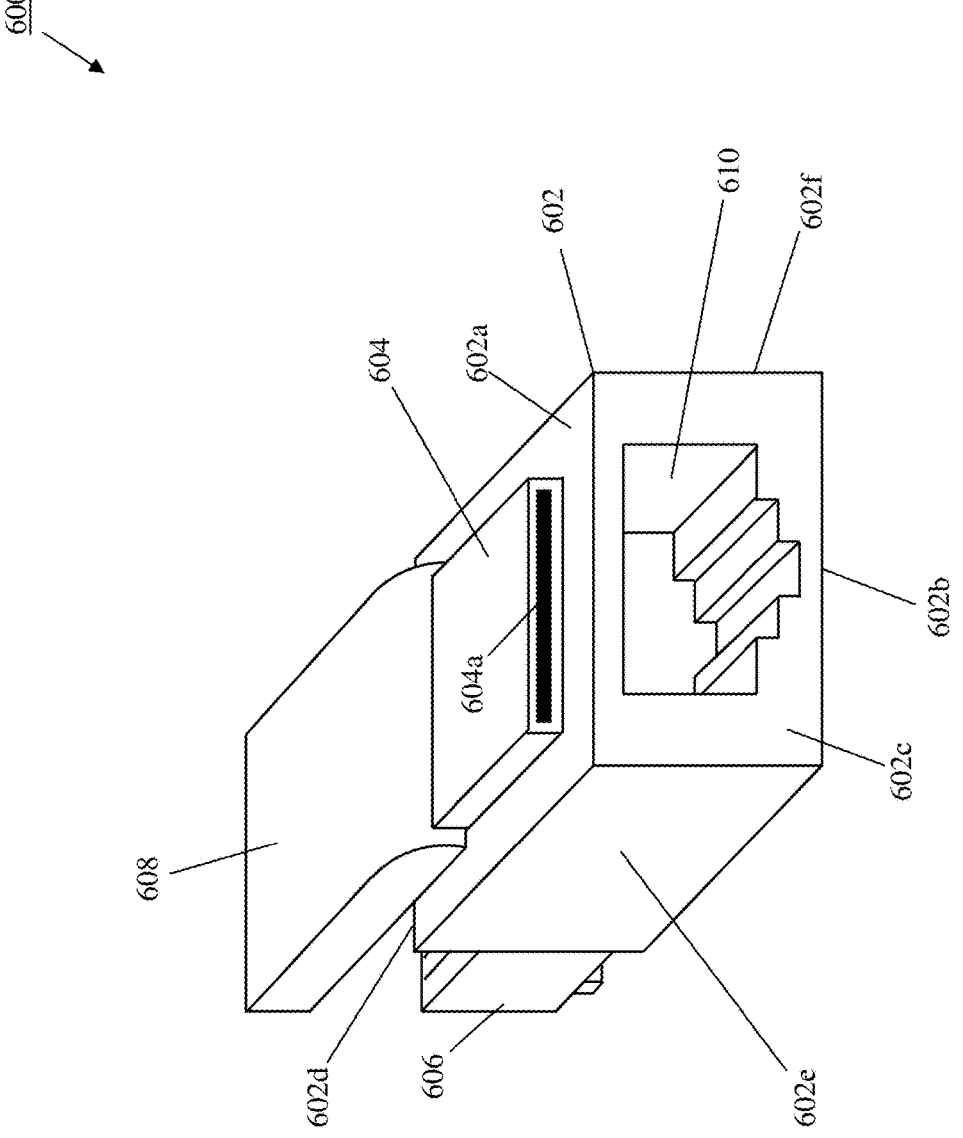
FIG. 6A is a perspective view illustrating an embodiment of the console information recording dongle device of FIG. 5.
Figure 6B:
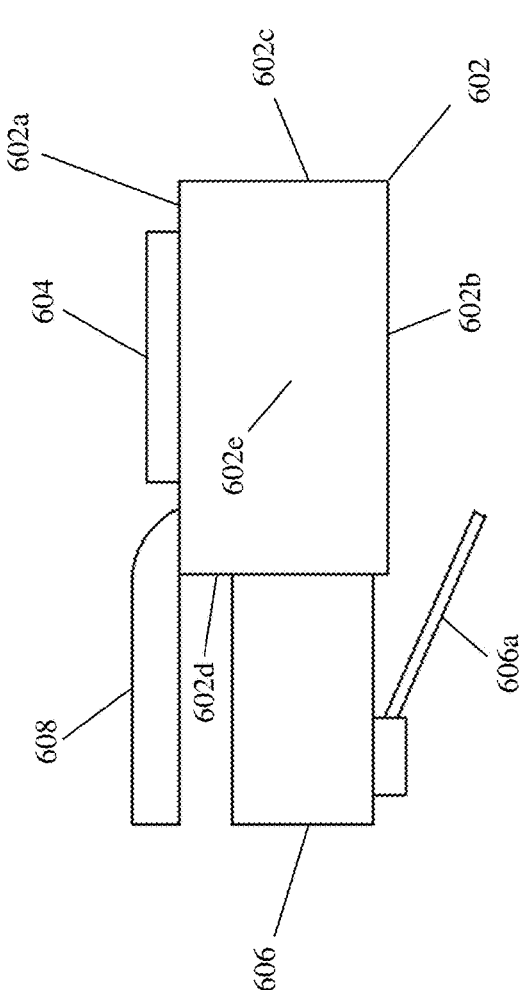
FIG. 6B is a side view illustrating an embodiment of the console information recording dongle device of FIG. 6A.

With reference to FIGS. 6A and 6B, an embodiment of a console information recording dongle device 600 is illustrated that may provide the console information recording dongle device 500 discussed above with reference to FIG. 5, and that is configured to be utilized with networking devices having networking device management ports and a networking device power port configured similarly as the networking device 300 discussed above with reference to FIG. 3. In the illustrated embodiment, the console information recording dongle device 600 includes a dongle chassis 602 having a top surface 602a, a bottom surface 602b that is located opposite the dongle chassis 602 from the top surface 602a, a front surface 602c that extends between the top surface 602a and the bottom surface 602b, a rear surface 602d that is located opposite the dongle chassis 602 from the front surface 602c and that extends between the top surface 602a and the bottom surface 602b, and a pair of opposing side surfaces 602e and 602f that are located opposite the dongle chassis 602 from each other and that extend between the top surface 602a, the bottom surface 602b, the front surface 602c, and the rear surface 602d.

As can be seen in FIGS. 6A and 6B, a storage slot element 604 is located on the top surface 602a of the dongle chassis 602 and defines a storage slot 604a that one of skill in the art in possession of the present disclosure will appreciate may provide access to the storage device connector 506 discussed above with reference to FIG. 5. A dongle device console connector 606 extends from the rear surface 602d of the dongle chassis 602, includes a dongle device console connector release member 606a, and one of skill in the art in possession of the present disclosure will recognize how the dongle device console connector 606 is illustrated as being provided by an RJ-45 type connector while appreciating how other type connectors will fall within the scope of the present disclosure as well. A dongle device power connector 608 extends from the top surface 602a of the dongle chassis 602 and substantially parallel to the dongle device console connector 606, and one of skill in the art in possession of the present disclosure will recognize how the dongle device power connector 608 is illustrated as being provided by USB-A type connector while appreciating how other type connectors will fall within the scope of the present disclosure as well. A dongle device console port 610 is accessible via the front surface 602c of the dongle chassis 602, and one of skill in the art in possession of the present disclosure will recognize how the dongle device console port 610 is illustrated as being provided by an RJ-45 type port while appreciating how other type ports will fall within the scope of the present disclosure as well. However, while a specific console information recording dongle device 600 is illustrated and described, one of skill in the art in possession of the present disclosure will appreciate how the console information recording dongle device of the present disclosure may be provided in a variety of configurations while remaining within the scope of the present disclosure as well.

Figure 7A:
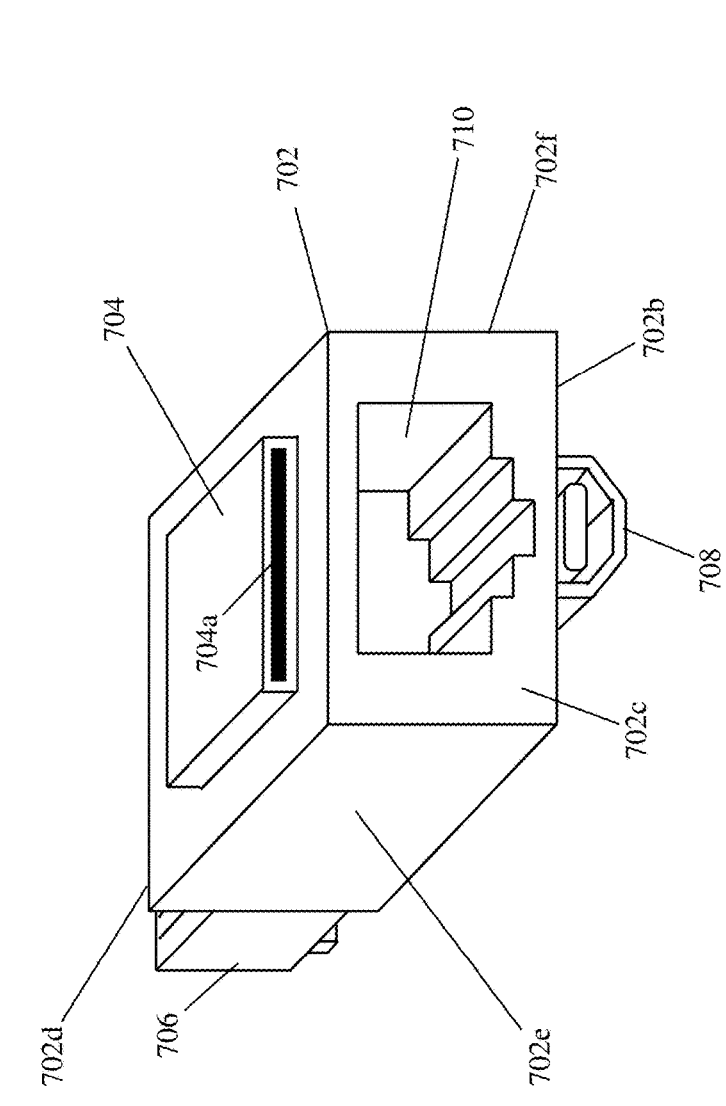
FIG. 7A is a perspective view illustrating an embodiment of the console information recording dongle device of FIG. 5.
Figure 7B:
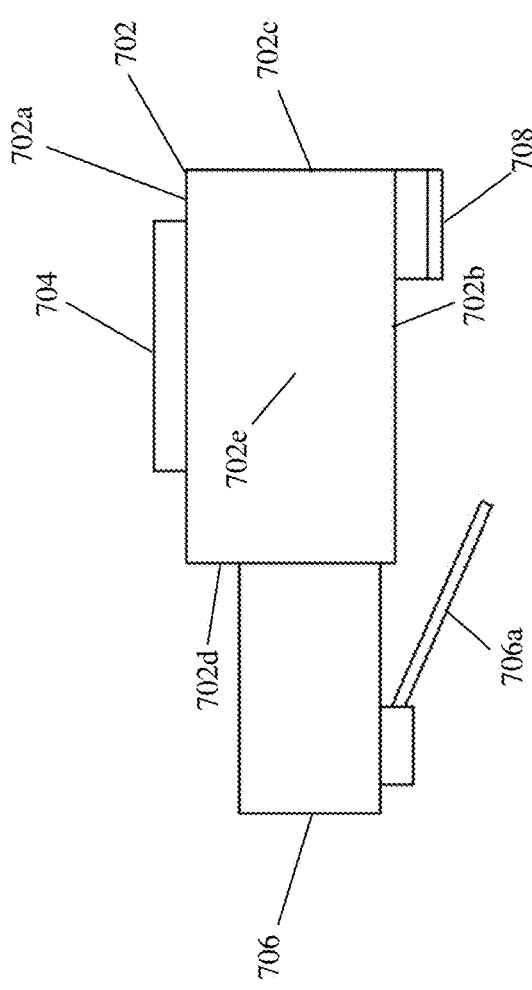
FIG. 7B is a side view illustrating an embodiment of the console information recording dongle device of FIG. 6A.

For example, with reference to FIGS. 7A and 7B, an embodiment of a console information recording dongle device 700 is illustrated that may provide the console information recording dongle device 500 discussed above with reference to FIG. 5, and that is configured to be utilized with networking devices having networking device management ports and a networking device power port configured similarly as the networking device 400 discussed above with reference to FIG. 4. In the illustrated embodiment, the console information recording dongle device 700 includes a dongle chassis 702 having a top surface 702a, a bottom surface 702b that is located opposite the dongle chassis 702 from the top surface 702a, a front surface 702c that extends between the top surface 702a and the bottom surface 702b, a rear surface 702d that is located opposite the dongle chassis 702 from the front surface 702c and that extends between the top surface 702a and the bottom surface 702b, and a pair of opposing side surfaces 702e and 702f that are located opposite the dongle chassis 702 from each other and that extend between the top surface 702a, the bottom surface 702b, the front surface 702c, and the rear surface 702d.

As can be seen in FIGS. 7A and 7B, a storage slot element 704 is located on the top surface 702a of the dongle chassis 702 and defines a storage slot 704 that one of skill in the art in possession of the present disclosure will appreciate may provide access to the storage device connector 506 discussed above with reference to FIG. 5. A dongle device console connector 706 extends from the rear surface 702d of the dongle chassis 702, includes a dongle device console connector release member 706a, and one of skill in the art in possession of the present disclosure will recognize how the dongle device console connector 706 is illustrated as being provided by an RJ-45 type connector while appreciating how other type connectors will fall within the scope of the present disclosure as well. A dongle device power connector 708 is located on the bottom surface 702b of the dongle chassis 702 and is accessible adjacent the front surface 702c of the dongle chassis 702, and one of skill in the art in possession of the present disclosure will recognize how the dongle device power connector 708 is illustrated as being provided by micro-USB/USB-B type connector while appreciating how other type connectors will fall within the scope of the present disclosure as well. A dongle device console port 710 is accessible via the front surface 702c of the dongle chassis 702, and one of skill in the art in possession of the present disclosure will recognize how the dongle device console port 710 is illustrated as being provided by an RJ-45 type port while appreciating how other type ports will fall within the scope of the present disclosure as well. As such, a wide variety of configurations of the console information recording dongle device that provide the functionality described below for any of a variety of networking device management port (and in some cases, networking device power port) configurations are envisioned as falling within the scope of the present disclosure.

Referring now to FIG. 8, an embodiment of a method 800 for recording console information from a computing device using a dongle device is illustrated. As discussed below, the systems and methods of the present disclosure provide a dongle device that connects to a networking device console port on a networking device, receives console information generated by the networking device via the networking device console port, and stores that console information in a storage device included in the dongle device. For example, the console information recording dongle system of the present disclosure may include a networking device having a networking device console port, and a console information recording dongle device. The console information recording dongle device includes a dongle device console connector that is connected to the networking device console port, a storage device, and a console information recording engine that is coupled to the dongle device console connector and the storage device. The console information recording engine receives console information generated by the networking device through the dongle device console connector via the networking device console port, and stores the console information in the storage device. The console information recording dongle device may also include a dongle device console port, and may transmit the console information that was received via the dongle device console connector through the dongle device console port. As such, console information generated by the networking device is stored and accessible even when a serial console connection available via the networking device console port on the networking device has not been used, and even when the networking device cannot initialize.

Figure 9A:
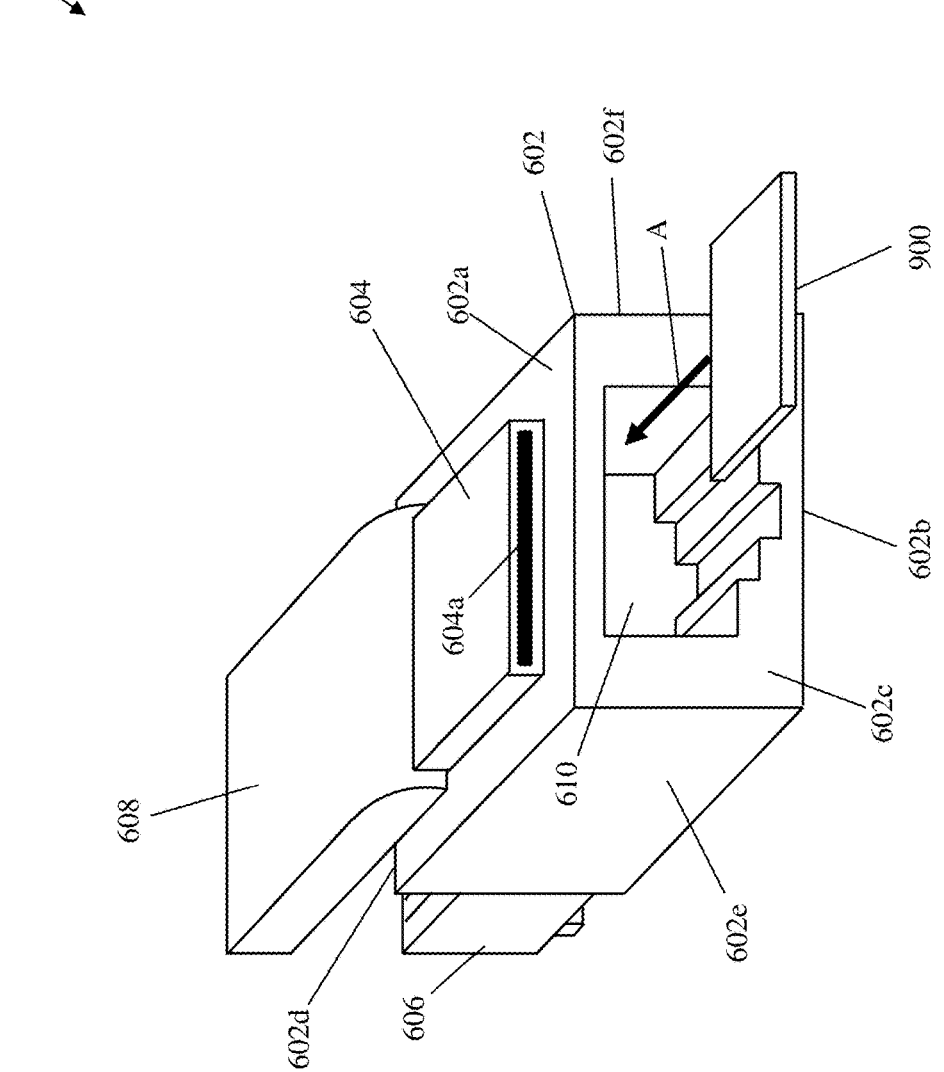
FIG. 9A is a perspective view illustrating an embodiment of a storage device being connected to the console information recording dongle device of FIGS. 6A and 6B.
Figure 9B:
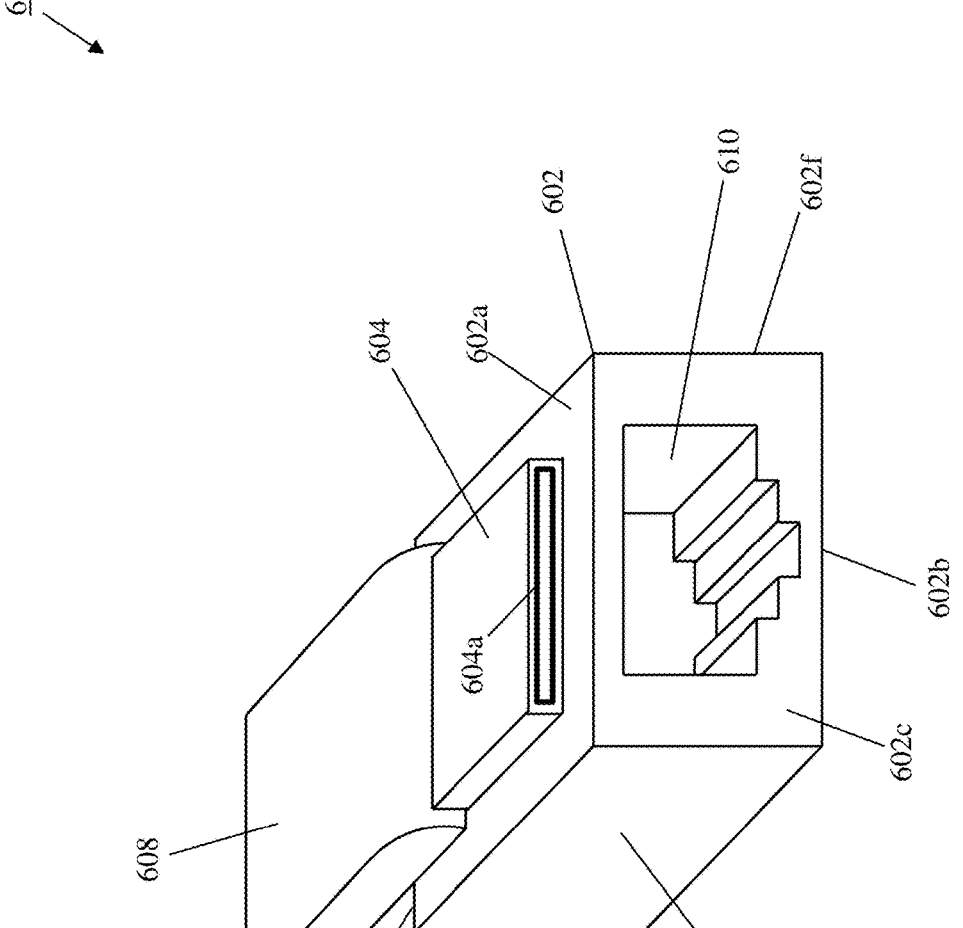
FIG. 9B is a perspective view illustrating an embodiment of a storage device connected to the console information recording dongle device of FIGS. 6A and 6B.

The method 800 may begin at optional block 802 where a storage device may be provided in a console information recording dongle device. With reference to FIG. 9A, in an embodiment of optional block 802, a user of the console information recording dongle device 600 may position a storage device 900 (e.g., a MicroSD card in the illustrated example) adjacent the front surface 602c of the dongle chassis 602 of the console information recording dongle device 600 such that the storage device 900 is aligned with the storage device slot 604a defined by the storage slot element 604 and oriented such that the connector on the storage device 900 is configured to engage the storage device connector (e.g., the storage device connector 506 discussed above with reference to FIG. 5) accessible via the storage device slot 604a. As illustrated in FIGS. 9A and 9B, the storage device 900 may then be moved in a direction A such that the storage device 900 moves through the storage device slot 604a defined by the storage slot element 604 until the storage device 900 engages the storage device connector accessible via the storage device slot 604a (e.g., similarly to the storage device 508 engaging the storage device connector 506 as illustrated in FIG. 5).

Figure 10A:
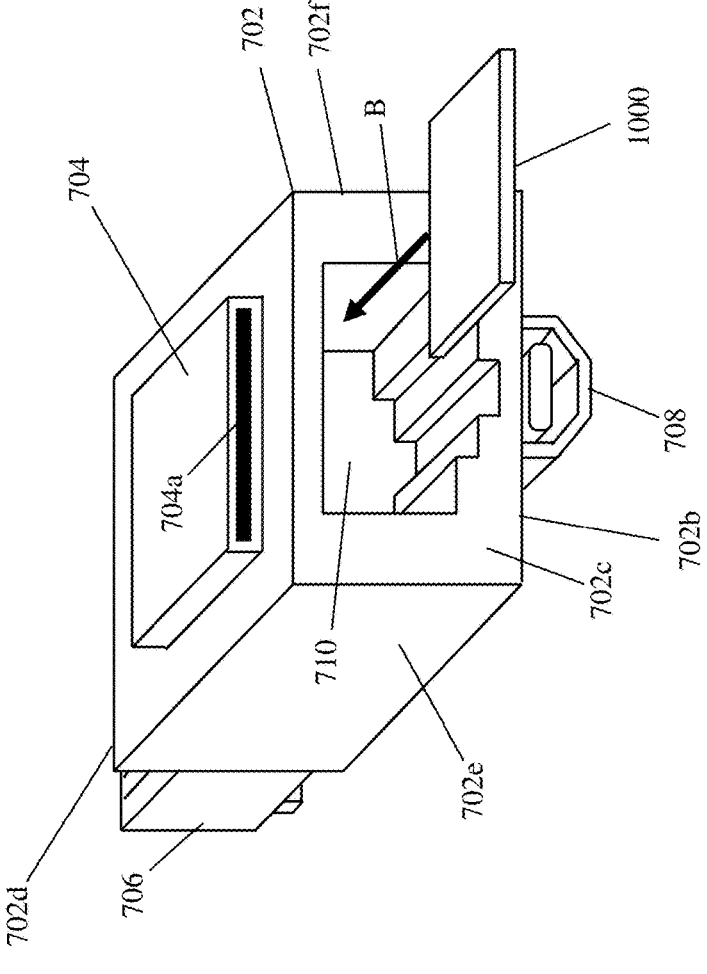
FIG. 10A is a perspective view illustrating an embodiment of a storage device being connected to the console information recording dongle device of FIGS. 7A and 7B.
Figure 10B:
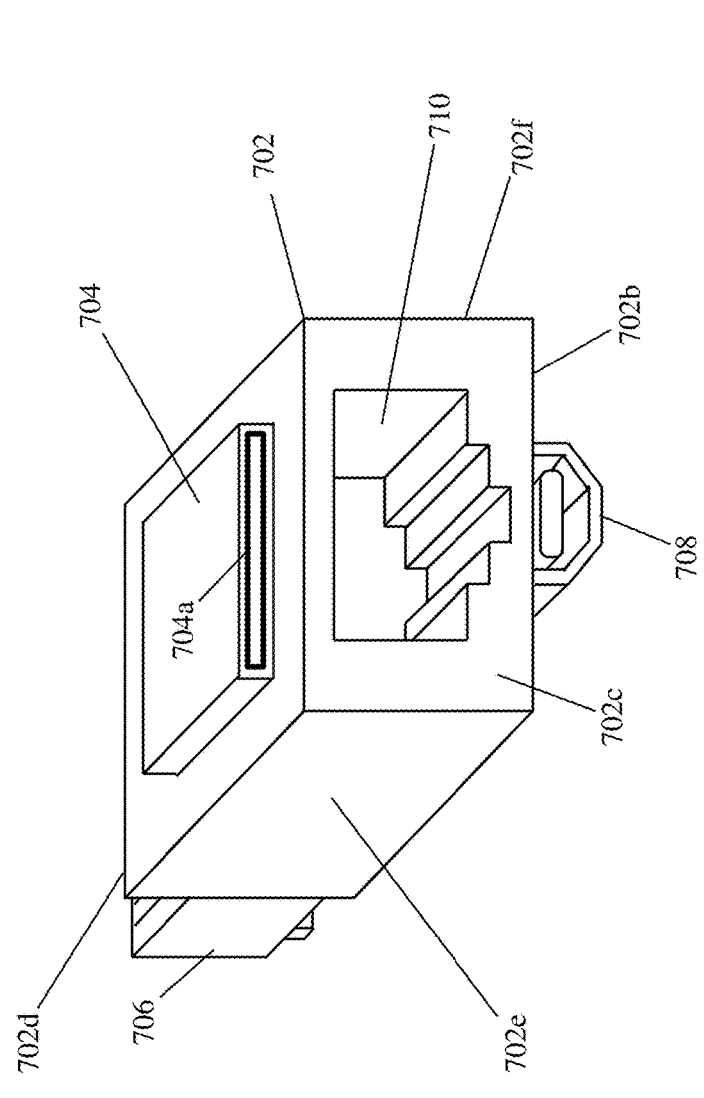
FIG. 10B is a perspective view illustrating an embodiment of a storage device connected to the console information recording dongle device of FIGS. 7A and 7B.

Similarly, with reference to FIG. 10A, in another embodiment of optional block 802, a user of the console information recording dongle device 700 may position a storage device 1000 (e.g., a MicroSD card in the illustrated example) adjacent the front surface 702c of the dongle chassis 702 of the console information recording dongle device 700 such that the storage device 1000 is aligned with the storage device slot 704a defined by the storage slot element 704 and oriented such that the connector on the storage device 700 is configured to engage the storage device connector (e.g., the storage device connector 506 discussed above with reference to FIG. 5) accessible via the storage device slot 704a. As illustrated in FIGS. 10A and 10B, the storage device 1000 may then be moved in a direction B such that the storage device 1000 moves through the storage device slot 704a defined by the storage slot element 704 until the storage device 1000 engages the storage device connector accessible via the storage device slot 704a (e.g., similarly the storage device 508 engaging the storage device connector 506 as illustrated in FIG. 5). However, while examples of the connection of storage devices to the console information recording dongle device of the present disclosure have been described, as discussed above some embodiments of the present disclosure may integrate the storage device in the console information recording dongle device of the present disclosure while remaining within its scope as well.

Figure 11A:
FIG. 11A is a schematic/side view illustrating an embodiment of the console information recording dongle device of FIGS. 6A and 6B being coupled to the networking device of FIG. 3.
Figure 11B:
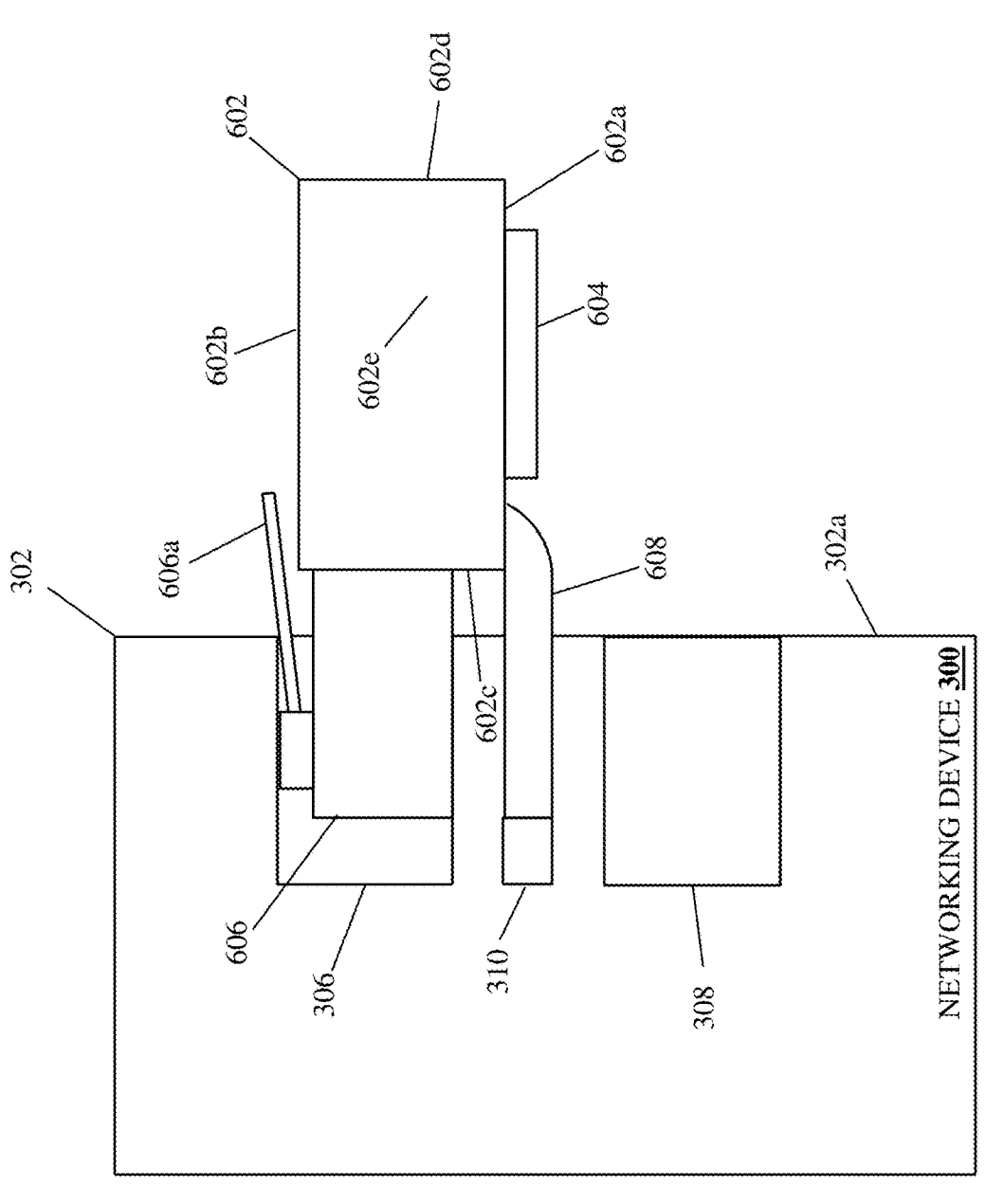
FIG. 11B is a schematic/side view illustrating an embodiment of the console information recording dongle device of FIGS. 6A and 6B coupled to the networking device of FIG. 3.

The method 800 may then proceed to, or may begin at, block 804 where the console information recording dongle device is connected to a networking device. With reference to FIG. 11A, in an embodiment of block 804, the user may position the console information recording dongle device 600 adjacent the front surface 302a of the chassis 302 of the networking device 300 such that the dongle device console connector 606 and the dongle device power connector 608 on the console information recording dongle device 600 are aligned with the networking device console port 306 and the networking device power port 310, respectively, on the networking device 300. With reference to FIGS. 11A and 11B, the console information recording dongle device 600 may be moved in a direction C such that the dongle device console connector 606 and the dongle device power connector 608 on the console information recording dongle device 600 engage the networking device console port 306 and the networking device power port 310, respectively, on the networking device 300, with the dongle device console connector release member 606a on the dongle device console connector 606 engaging the chassis 302 to secure the console information recording dongle device 600 to the networking device 300 (and with the dongle device console connector release member 606a actuatable to disengage the chassis 302 to release the console information recording dongle device 600 from the networking device 300).

Figure 12A:
FIG. 12A is a schematic/side view illustrating an embodiment of the console information recording dongle device of FIGS. 7A and 7B being coupled to the networking device of FIG. 4.
Figure 12B:
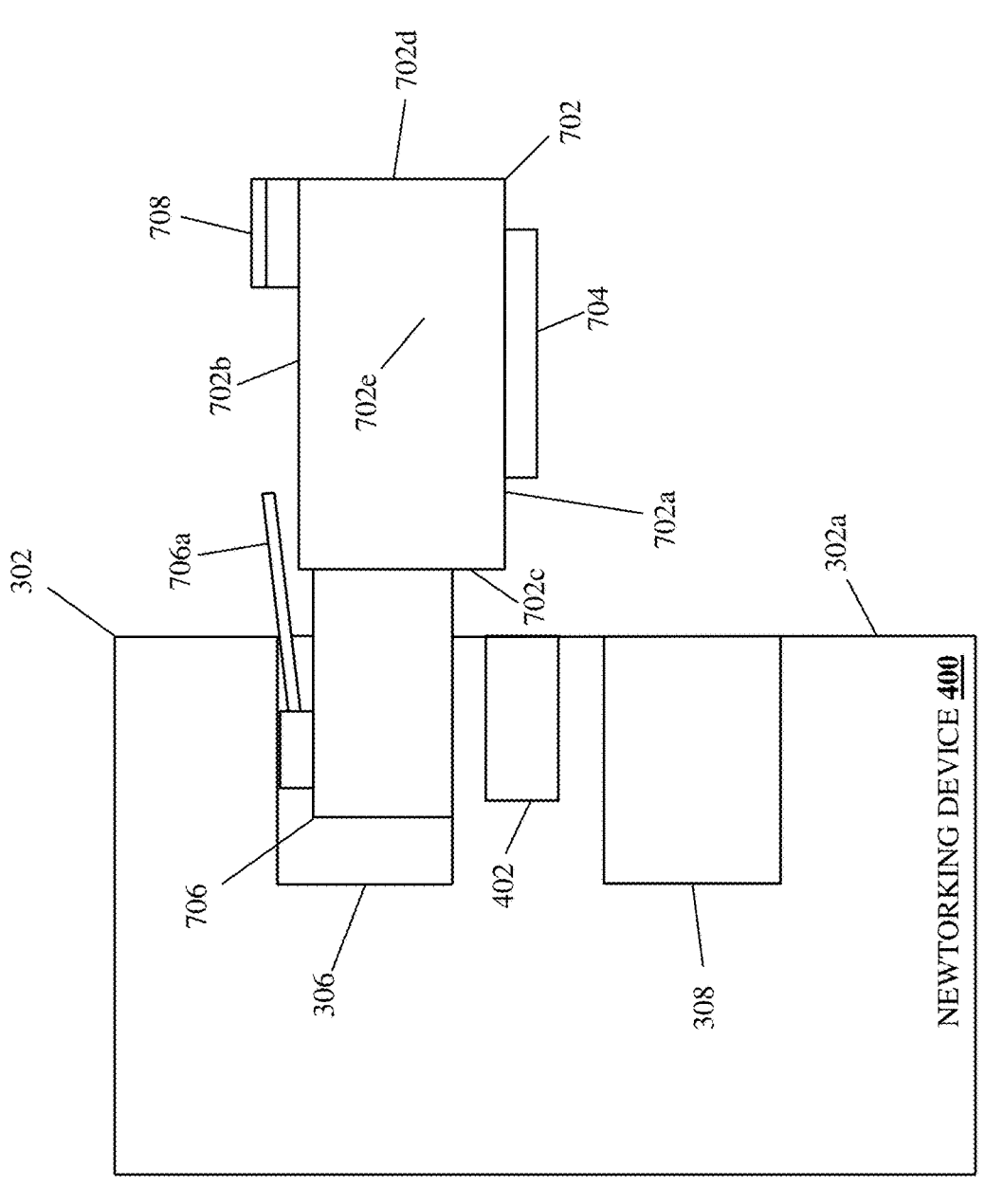
FIG. 12B is a schematic/side view illustrating an embodiment of the console information recording dongle device of FIGS. 7A and 7B coupled to the networking device of FIG. 4.

With reference to FIG. 12A, in another embodiment of block 804, the user may position the console information recording dongle device 700 adjacent the front surface 302*a* of the chassis 302 of the networking device 400 such that the dongle device console connector 706 on the console information recording dongle device 700 is aligned with the networking device console port 306 on the networking device 400. With reference to FIGS. 12A and 12B, the console information recording dongle device 700 may be moved in a direction D such that the dongle device console connector 706 on the console information recording dongle device 700 engages the networking device console port 306 on the networking device 400, with the dongle device console connector release member 706*a* on the dongle device console connector 706 engaging the chassis 302 to secure the console information recording dongle device 700 to the networking device 400 (and with the dongle device console connector release member 706*a* actuatable to disengage the chassis 302 to release the console information recording dongle device 700 from the networking device 400).

Figure 12C:
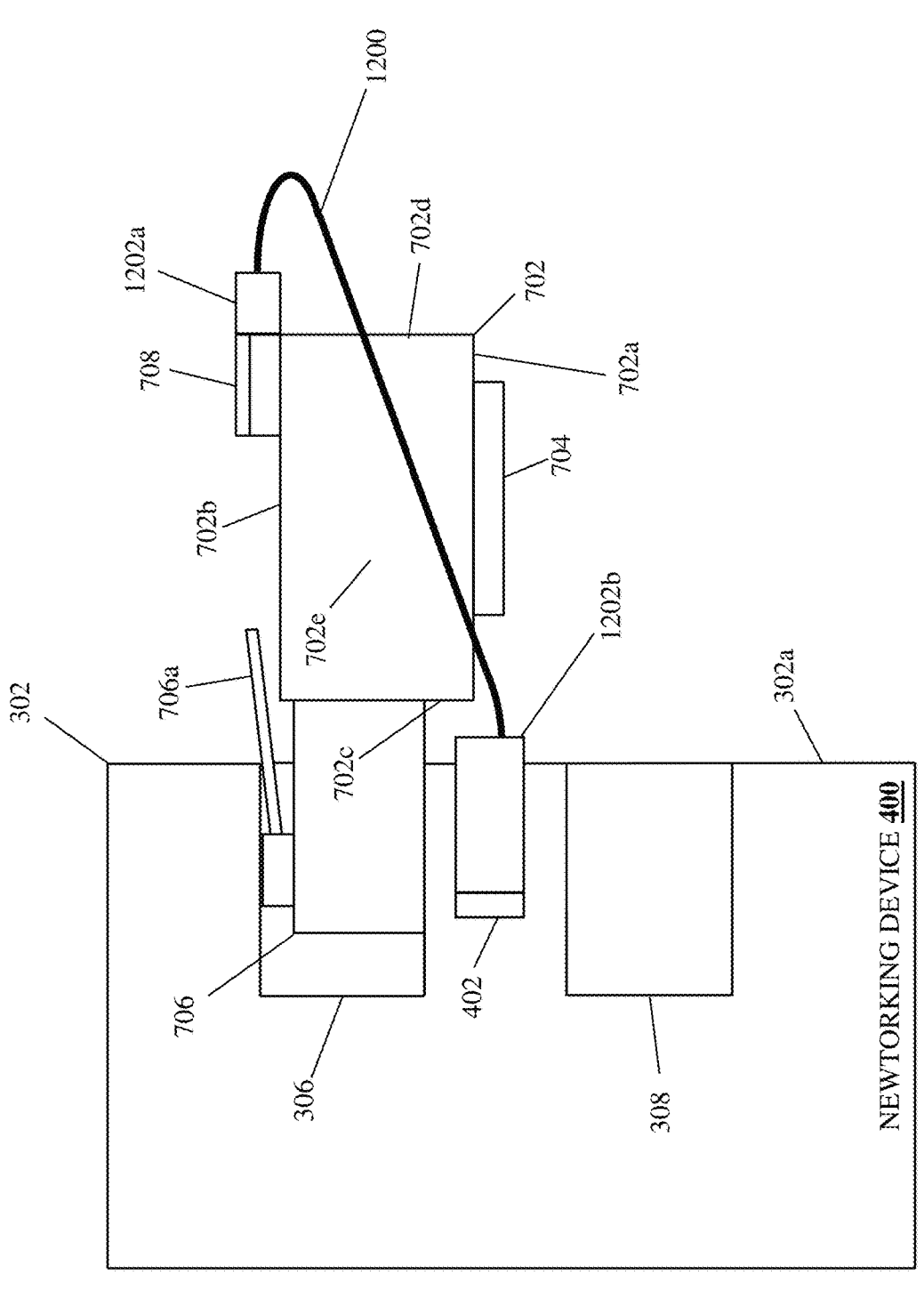
FIG. 12C is a schematic/side view illustrating an embodiment of the console information recording dongle device of FIGS. 7A and 7B coupled to the networking device of FIG. 4.

With reference to FIG. 12C, the user may then provide a power cable 1200, and may connect a first power connector 1202*a* on the power cable 1200 to the dongle device power connector 708, while connecting a second power connector 1202*b* on the power cable 1200 to the networking device power connector 402. However, while examples of the connection of the console information recording dongle device of the present disclosure to a networking device to power the console information recording dongle device have been described, as discussed above some embodiments of the present disclosure may power the console information recording dongle device internally using a battery or other power source in the console information recording dongle device while remaining within its scope as well.

Figure 13:
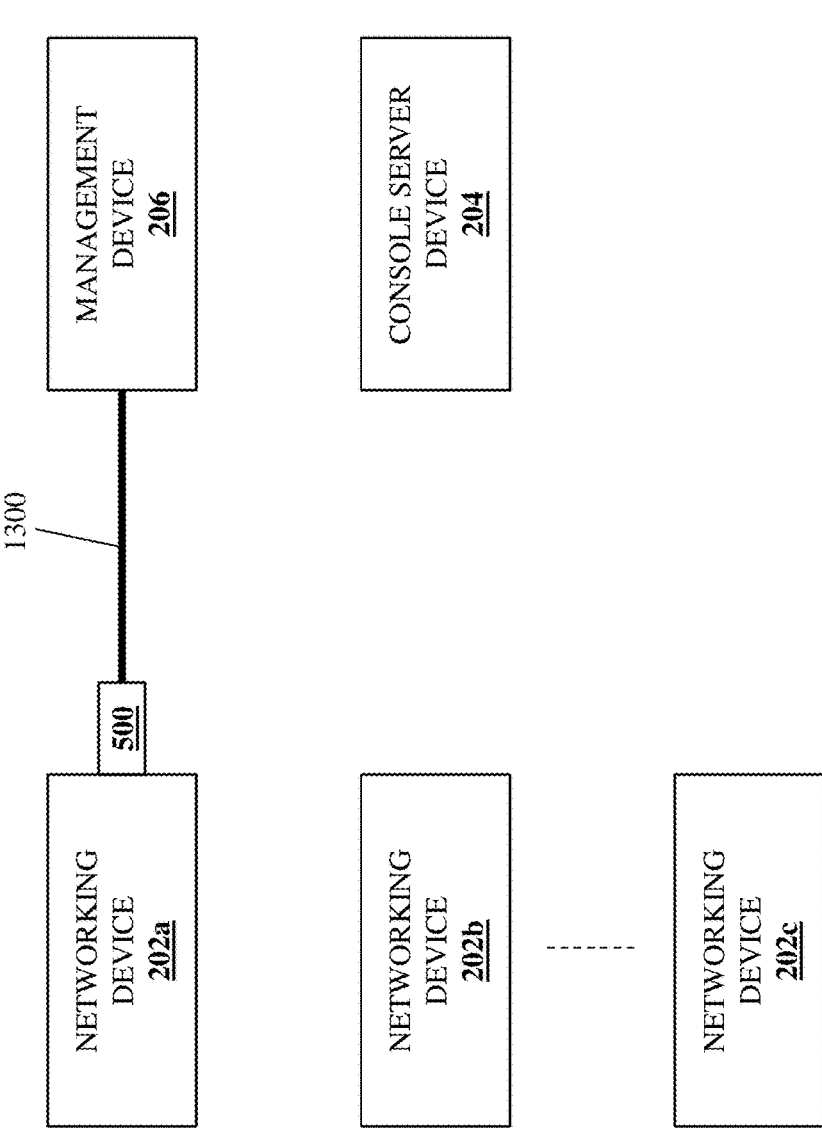
FIG. 13 is a schematic view of the console information recording dongle device of FIG. 5 coupled to a networking device and a management device in the networked system of FIG. 2.

The method 800 may then proceed to optional block 806 where a dongle device console port on the console information recording dongle device may be connected to a management device or a console server device. With reference to FIG. 13, in an embodiment of optional block 806, the console information recording dongle device 500 has been connected to the networking device 202*a*, and the management device 206 may be coupled to the console information recording dongle device 500 by connecting a cable 1300 (e.g., an Ethernet cable) to the management device 206 and to the dongle device console port 514 on the console information recording dongle device 500. For example, one of skill in the art in possession of the present disclosure will appreciate how a user of the networking device 202*a*/300/ 400 may wish to access the serial console connection that is conventionally available via the networking device console port 306 on the networking device 202/300, and thus may bring the management device 206 (e.g., a laptop/notebook computing device) to the location of the networking device 202*a*/300/400 and connect the cable 1300 (e.g., an Ethernet cable) to each of the management device 206 and the dongle device console port 514 on the console information recording dongle device 500 in order to do so.

Figure 14:
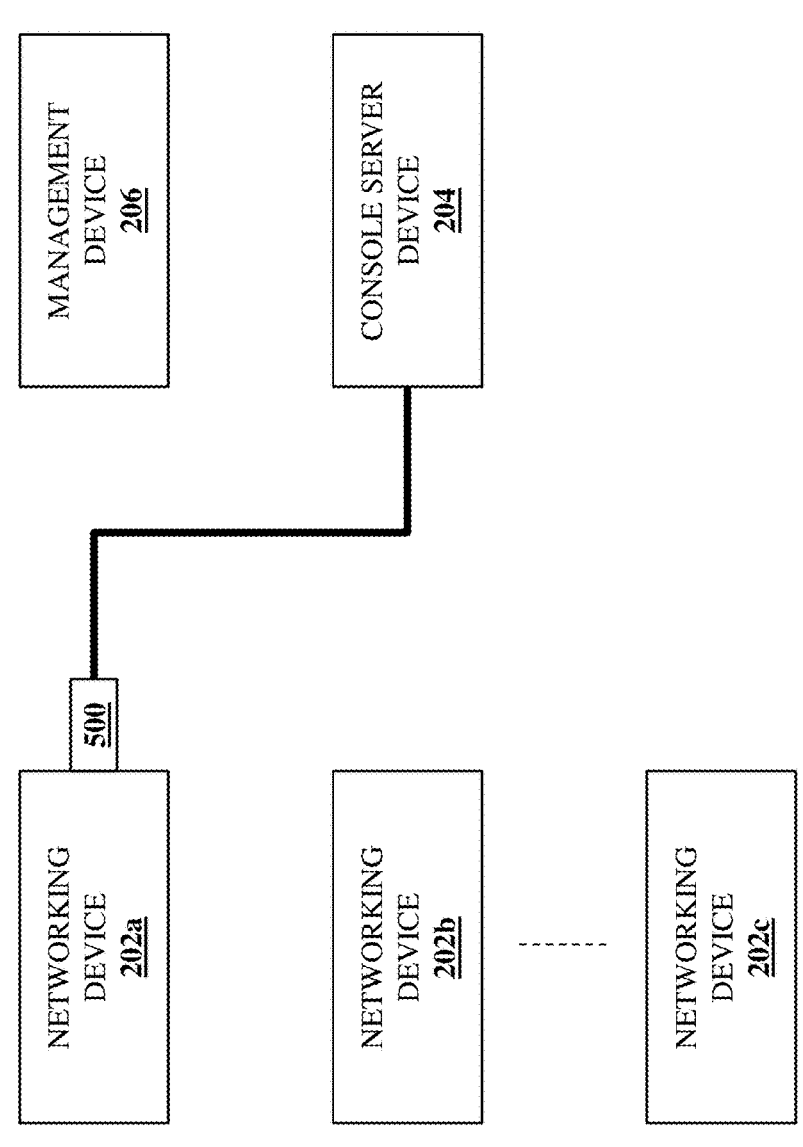
FIG. 14 is a schematic view of the console information recording dongle device of FIG. 5 coupled to a networking device and a console server device in the networked system of FIG. 2.

With reference to FIG. 14, in another embodiment of optional block 806, the console information recording dongle device 500 has been connected to the networking device 202*a*, and the console server device 204 may be coupled to the console information recording dongle device 500 by connecting a cable 1300 (e.g., an Ethernet cable) to the console server device 204 and to the dongle device console port 514 on the console information recording dongle device 500. For example, one of skill in the art in possession of the present disclosure will appreciate how a user of the networking device 202*a*/300/400 may wish to have continuous access the serial console connection that is conventionally available via the networking device console port 306 on the networking device 202*a*/300/400, and thus may keep the console server device 204 connected to the dongle device console port 514 on the console information recording dongle device 500 via the cable 1300 (e.g., an Ethernet cable) in order to do so. However, while the dongle device console port on the console information recording dongle devices of the present disclosure have been described as being connected to management devices or console server devices, one of skill in the art in possession of the present disclosure will appreciate how the dongle device console port on the console information recording dongle devices of the present disclosure need not be connected to any devices while remaining within the scope of the present disclosure as well.

Figure 15:
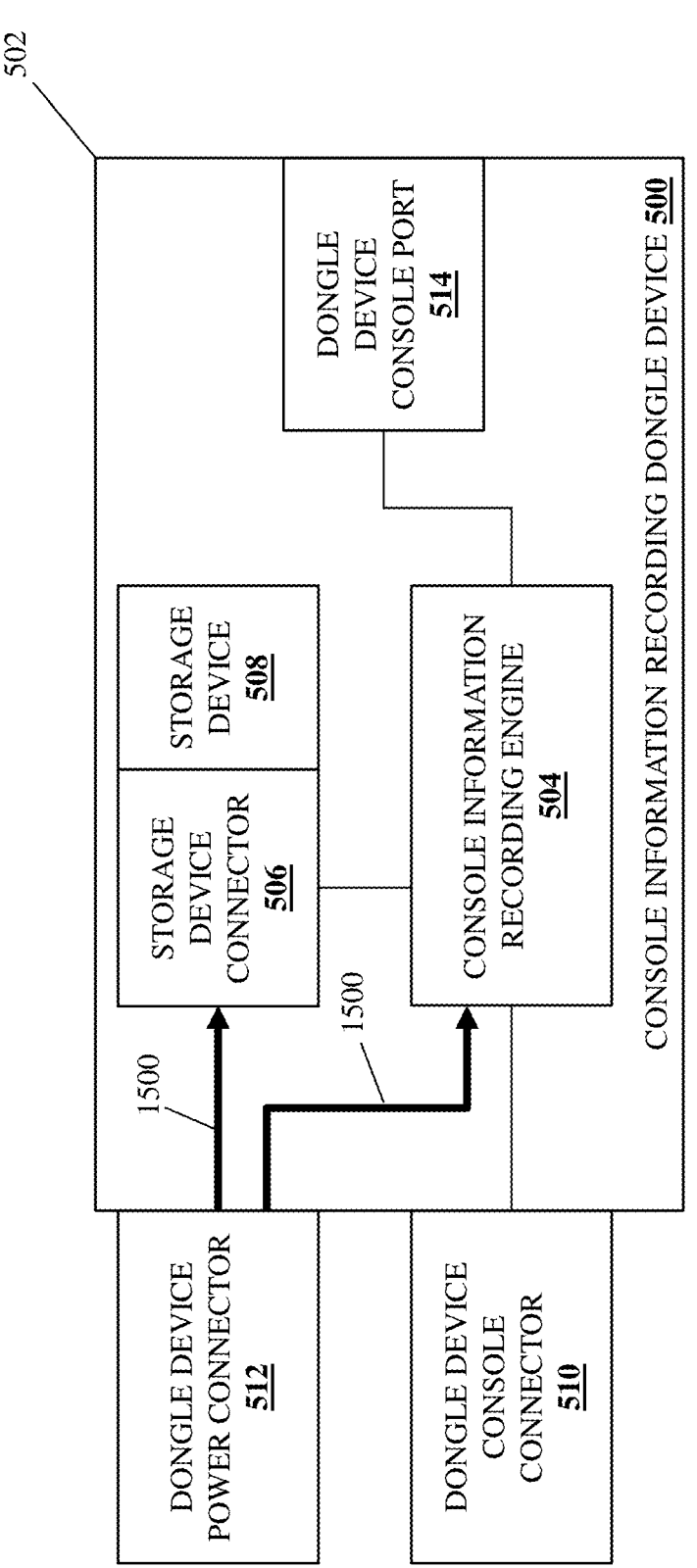
FIG. 15 is a schematic view illustrating the console information recording dongle device of FIG. 5 operating during the method of FIG. 8.

The method 800 then proceeds to block 808 where the console information recording dongle device receives power. With reference to FIG. 15, in an embodiment of block 808, the console information recording dongle device 500 may perform powering operations 1500 that include receiving power via the dongle device power connector 512 (e.g., directly from the networking device power port 310 on the networking device 300, or from the networking device power port 402 on the networking device 400 via the power cable 1200), and providing that power to the console information recording engine 504 (e.g., to the processing system and memory system that provide the console information recording engine 504), the storage connector 506 (and thus the storage device 508 connected thereto), as well as any other components that one of skill in the art in possession of the present disclosure would recognize as requiring power to provide any of the functionality described below. However, as discussed above, rather than receive power externally from a networking device as described above, one of skill in the art in possession of the present disclosure will appreciate how the console information recording dongle device 500 and its components may be powered internally via a battery or other power source included in the console information recording dongle device 500 while remaining within the scope of the present disclosure as well.

Figure 16A:
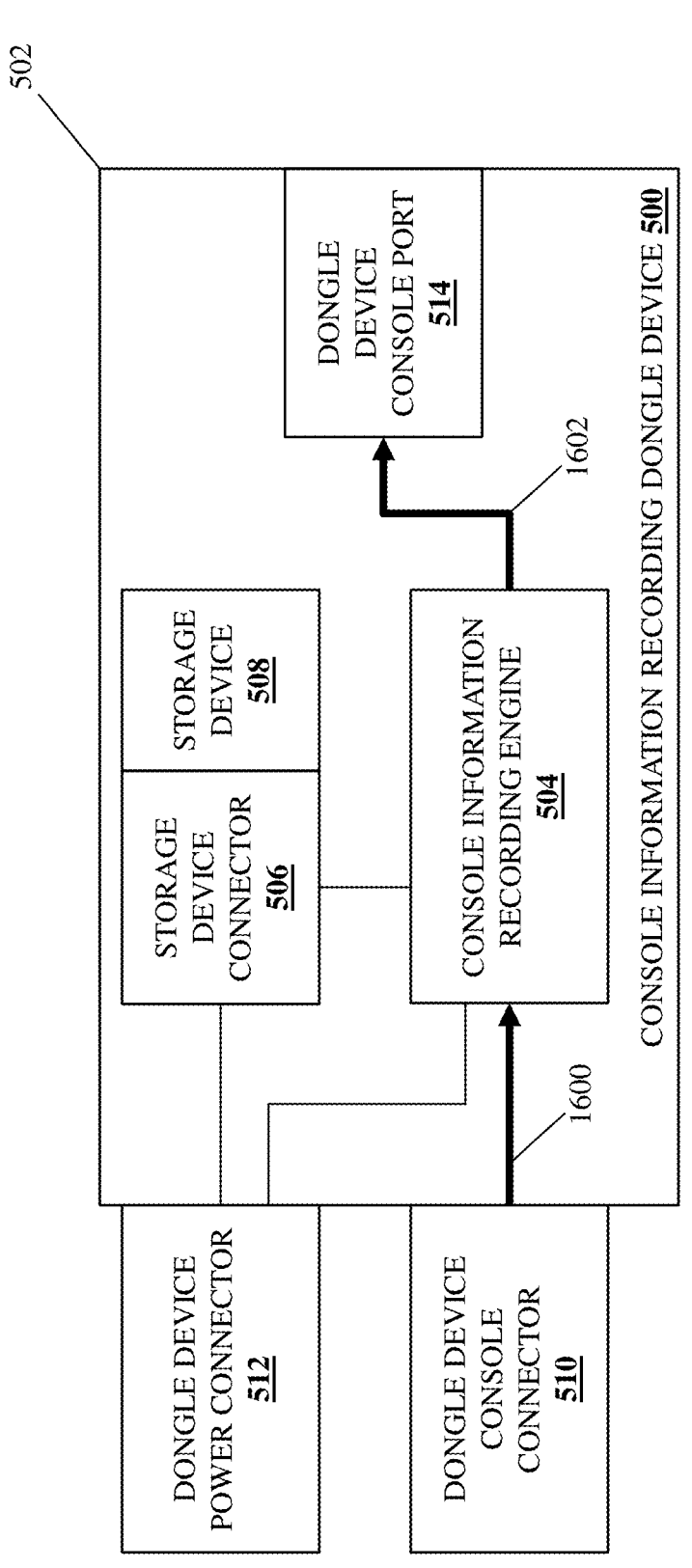
FIG. 16A is a schematic view illustrating the console information recording dongle device of FIG. 5 operating during the method of FIG. 8.

The method 800 may then proceed to optional block 810 where the console information recording dongle device may configure a console connection with the networking device. With reference to FIG. 16A, in an embodiment of optional block 810 and in response to receiving power at block 808, the console information recording engine 504 may perform console configuration identification operations 1600 that may include reading, via the connection of the dongle device console connector 510 and the networking device console port 306, a console configuration (e.g., a baudrate, etc.) from a configuration section of a flash storage device or other configuration storage in the networking device 300/400. In some embodiments of optional block 810 (e.g., the embodiments in which the management device 206 or console server device 204 are coupled to the dongle device console port 514), the console information recording engine 504 may perform console configuration reporting operations 1602 that may include transmitting the console configuration via the dongle device console port 514 (e.g., for display on the management device 206 connected to the console server device 204, a computing device connected to the console server device 204, etc.).

Figure 16B:
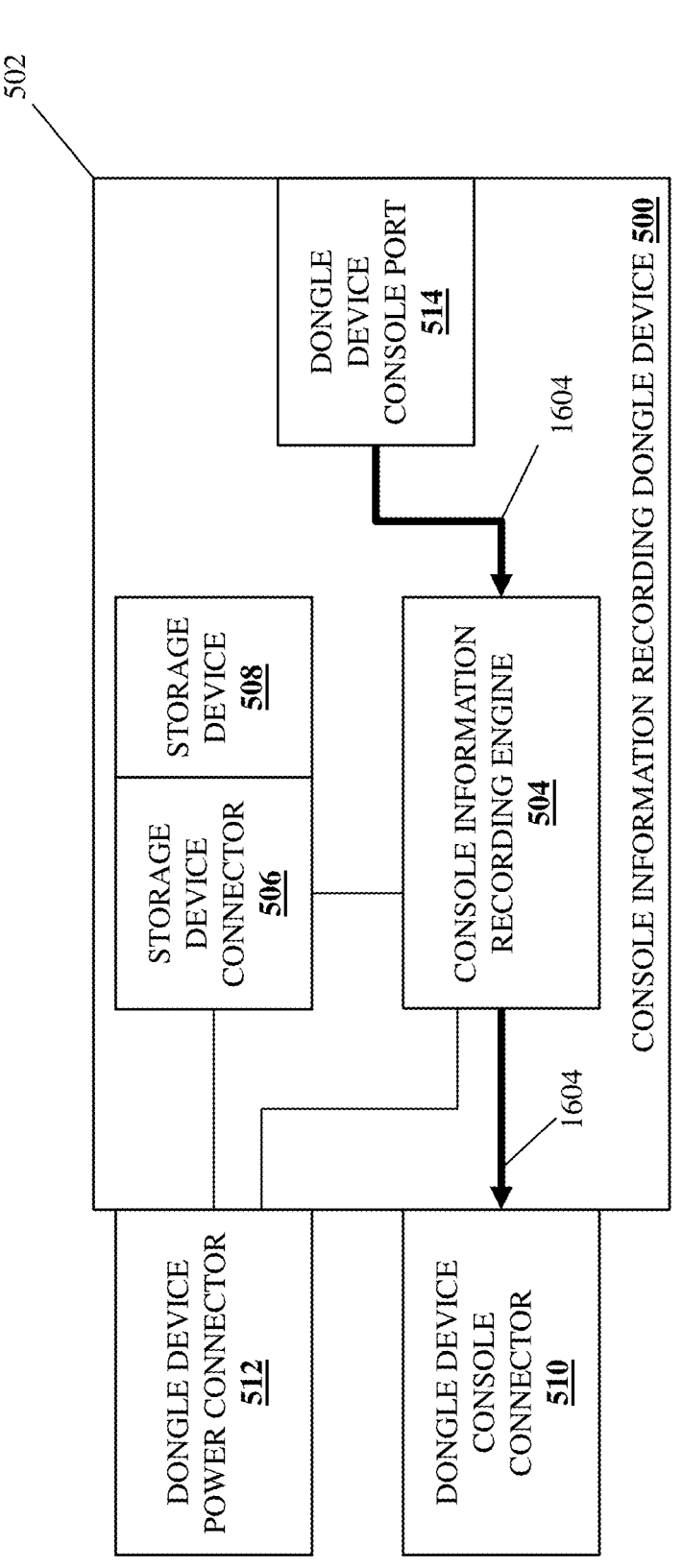
FIG. 16B is a schematic view illustrating the console information recording dongle device of FIG. 5 operating during the method of FIG. 8.

With reference to FIG. 16B, in some embodiments of optional block 810 (e.g., the embodiments in which the management device 206 or console server device 204 are coupled to the dongle device console port 514), the console information recording engine 504 may perform console configuration operations 1604 that include receiving console configuration instructions via the dongle device console port 514 (e.g., from the management device 206, a device connected to the console server device 204, etc.). For example, a user of the management device 206, or a user connected to the console server device 208 via a computing device, may provide a command sequence on an input device (e.g., "ESC"+"SHIFT"+"C") to generate and transmit an instruction to change the console configuration (e.g., to change from a default baudrate of 9600 to a baudrate of 115200) via the dongle device console port 514. As illustrated in FIG. 16B, in response to receiving the console configuration instructions, the console configuration operations 1604 performed by the console information recording engine 504 may include modifying the console configuration (e.g., the baudrate, etc.) in the configuration section of a flash storage device or other configuration storage in the networking device 300, as instructed.

Figure 17:
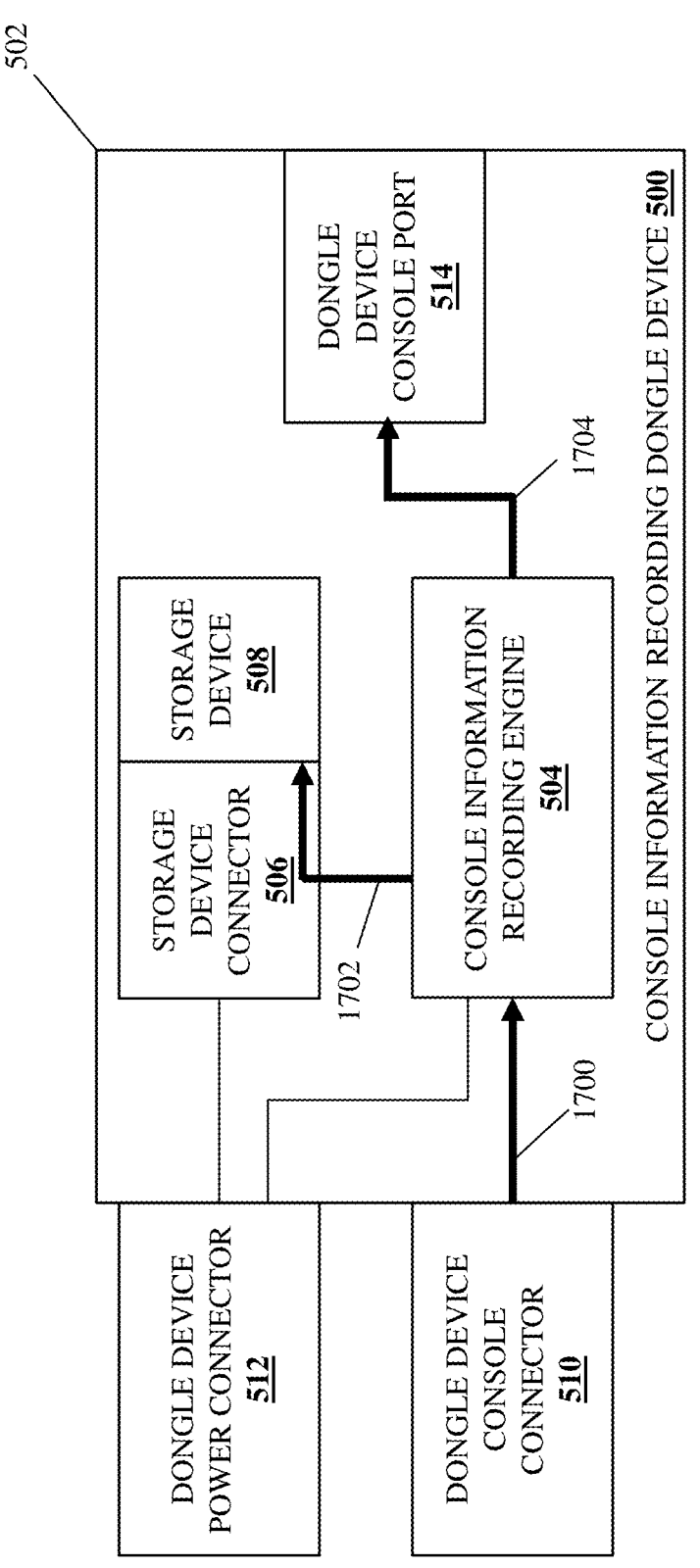
FIG. 17 is a schematic view illustrating the console information recording dongle device of FIG. 5 operating during the method of FIG. 8.

The method 800 then proceeds to block 812 where the console information recording dongle device receives console information from the networking device. With reference to FIG. 17, in an embodiment of block 812, the console information recording engine 504 may perform console information receiving operations 1700 that include receiving console information generated and transmitted by the networking device 300 via the networking device console port 202a and the dongle device console connector 510, and one of skill in the art in possession of the present disclosure will appreciate that any of a variety of console information (e.g., console logs and/or other console information known in the art) may be generated and transmitted by the networking device 300 via its networking device console port 306 while remaining within the scope of the present disclosure. For example, at block 812, the console information recording engine 504 may use the UART discussed above to read characters output by the networking device 202a/300/400 via the networking device console port 306 and received at the dongle device console connector 510 during initialization of the networking device 202a/300/400 (e.g., prior to the availability of an operating system (e.g., a NOS) in the networking device), although the receiving of console information during runtime of the networking device 202a/300/400 will fall within the scope of the present disclosure as well.

The method 800 then proceeds to block 814 where the console information recording dongle device stores the console information in the storage device. With continued reference to FIG. 17, in an embodiment of block 814, the console information recording engine 504 may perform console information recording operations 1702 that include providing the console information received at block 812 via the storage device connector 506 for storage in the storage device 508, which one of skill in the art in possession of the present disclosure will appreciate may include queuing that console information in a queue so that console information is written to the storage device 508 at block 814. Furthermore, one of skill in the art in possession of the present disclosure will appreciate how a variety of a data overwrite techniques may be employed by the console information recording engine 504 as the available storage space provided by the storage device 508 becomes limited including, for example, overwriting the "oldest" console information present on the storage device 508 with the "new" console information.

The method 800 may then proceed to optional block 816 where the console information recording dongle device may transmit the console information via the dongle device console port. With continued reference to FIG. 17, in an embodiment of optional block 816, the console information recording engine 504 may perform console information transmission operations 1704 that include transmitting the console information received at block 812 via the dongle device console port 514 (e.g., to the management device 206, a device connected to the console server device 204, etc.). For example, at optional block 816, the console information recording engine 504 may write the console information to the UART discussed above to retransmit the console information received from the networking device 202a/300/400 via the networking device console port 306 via the dongle device console port 514.

Figure 18:
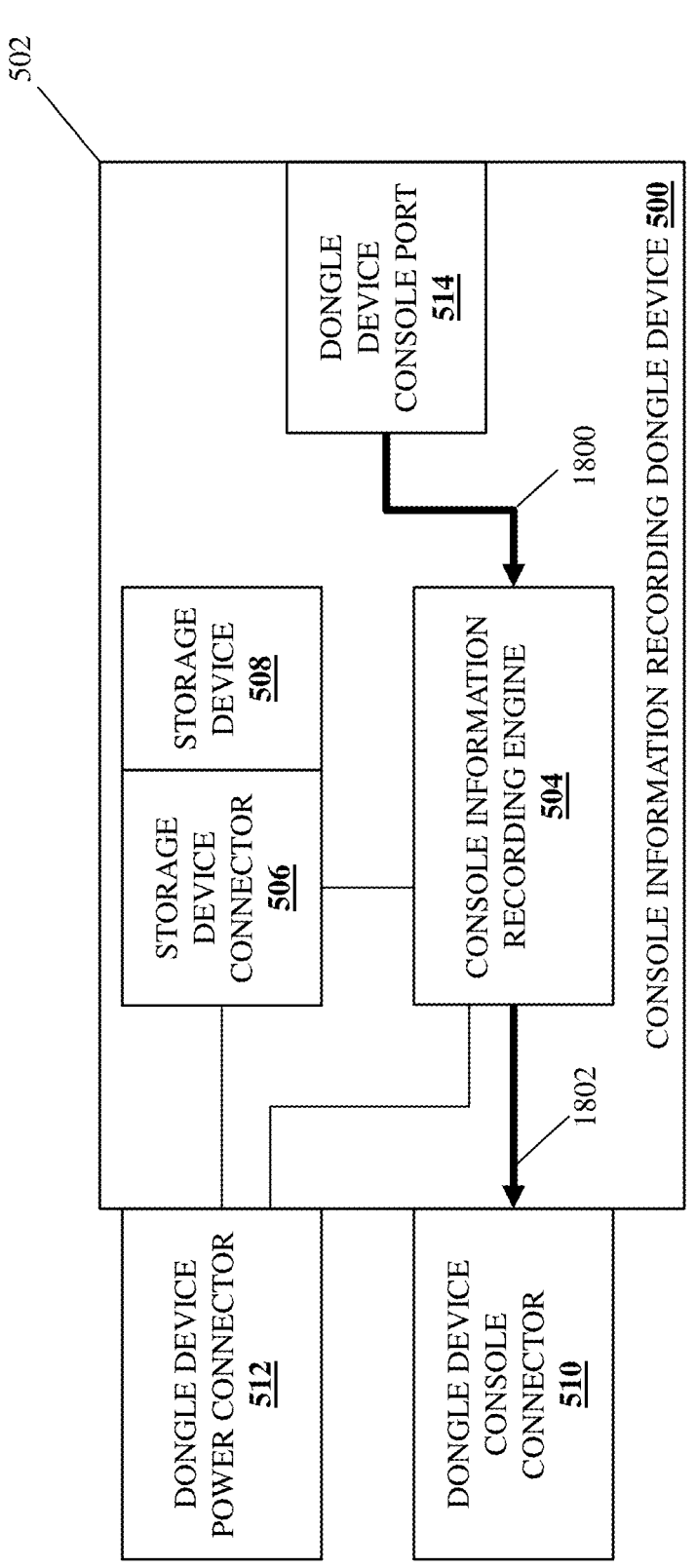
FIG. 18 is a schematic view illustrating the console information recording dongle device of FIG. 5 operating during the method of FIG. 8.

The method 800 may then proceed to optional block 818 where the console information recording dongle device may receive networking device information via the dongle device console port. With reference to FIG. 18, in an embodiment of optional block 818, the console information recording engine 504 may perform networking device information receiving operations 1800 that may include receiving networking device information via the dongle device console port 514 (e.g., from the management device 206, a device connected to the console server device 204, etc.), and one of skill in the art in possession of the present disclosure will appreciate how a user may provide any of a variety of networking device information for the networking device 202a/300/400 at optional block 818 via its networking device console port 306 while remaining within the scope of the present disclosure. For example, at optional block 818, the console information recording engine 504 may use the UART discussed above to read characters received at the dongle device console port 514 from a user directly connected to the dongle device console port 514 via the management device 206, or coupled to the done device console port 414 via the console server device 204.

The method 800 may then proceed to optional block 820 where the console information recording dongle device may transmit the networking device information to the networking device. As illustrated in FIG. 18, in an embodiment of optional block 820 and in response to receiving the networking device information at optional block 818, the console information recording engine 504 may perform networking device information provisioning operations 1802 that include providing the networking device information received at optional block 818 via the dongle device console connector 510 and the networking device console port 306 to the networking device 300. For example, at optional block 820, the console information recording engine 504 may write the networking device information to the UART discussed above to retransmit the networking device information received via the dongle device console port 514 to the networking device 300 via the dongle device console connector 510 and the networking device console port 306. As will be appreciated by one of skill in the art in possession of the present disclosure, networking device information received via the dongle device console port 514 typically need not be recorded or otherwise stored in the storage device 508 (as such information is typically echoed by a Command Line Interface (CLI) in the networking device 300), although the recording/storage of such networking device information may be performed while remaining within the scope of the present disclosure.

Thus, systems and methods have been described that provide a dongle device that connects to a networking device console port on a networking device, receives console information generated by the networking device via the networking device console port, and stores that console information in a storage device included in the dongle device. For example, the console information recording dongle system of the present disclosure may include a networking device having a networking device console port, and a console information recording dongle device. The console information recording dongle device includes a dongle device console connector that is connected to the networking device console port, a storage device, and a console information recording engine that is coupled to the dongle device console connector and the storage device. The console information recording engine receives console information generated by the networking device through the dongle device console connector via the networking device console port, and stores the console information in the storage device. The console information recording dongle device may also include a dongle device console port, and may transmit the console information that was received via the dongle device console connector through the dongle device console port.

As such, console information generated by the networking device is stored and accessible even when a serial console connection available via the networking device console port on the networking device has not been used, and even when the networking device cannot initialize. Thus, users that do not utilize the serial console connection available on their networking devices (e.g., via a management device or console server device connected to that networking device via that serial console connection) may connect the console information recording dongle device to the networking device console port on those networking devices in order to enable the recording of console information generated by those networking devices in the console information recording dongle device, and subsequent access to that console information in the event the networking device becomes unavailable. Furthermore, even users that utilize the serial console connection available on their networking devices (e.g., via a management device or console server device connected to that networking device via that serial console connection) may connect the console information recording dongle device to the networking device console port on those networking devices in order to provide for the backing up of console information generated by those networking devices in the console information recording dongle device, and subsequent access to that console information in the event a console connection or console server device becomes unavailable.

For example, in the event a networking device becomes unavailable, a user that does not utilize the serial console connection available on their networking devices may provide the console information generated by that networking device prior to its unavailability by removing the storage device from the console information recording dongle device and sending that storage device to a networking device provider, removing the console information recording dongle device from that networking device and sending that console information recording dongle device to a networking device provider, removing the storage device from the console information recording dongle device and connecting it to a computing device (e.g., the management device 206 discussed above) to access that console information and transmit it via a network to a networking device provider, connecting to the console information recording dongle device (e.g., via the management device 206 discussed above) and instructing the console information recording engine 504 to retrieve that console information from the storage device 508 and transmit it via a network to a networking device provider (e.g., via a "microSD card dump" of that console information), and/or using other techniques that would be apparent to one of skill in the art in possession of the present disclosure.

Furthermore, even when a user utilizes the serial console connection available on their networking devices, if issues with the console cabling connected to the networking device console port, unavailability of the console server device, and/or other situations arise in which the console information available to that user is incomplete, that user may access and provide the missing console information by removing the storage device from the console information recording dongle device and sending that storage device to a networking device provider, removing the console information recording dongle device from that networking device and sending that console information recording dongle device to a networking device provider, removing the storage device from the console information recording dongle device and connecting it to a computing device (e.g., the management device 206 discussed above) to access that console information and transmit it via a network to a networking device provider, connecting to the console information recording dongle device (e.g., via the management device 206 discussed above) and instructing the console information recording engine 504 to retrieve that console information from the storage device 508 and transmit it via a network to a networking device provider (e.g., via a "microSD card dump" of that console information), and/or using other techniques that would be apparent to one of skill in the art in possession of the present disclosure.

As discussed above, one of skill in the art in possession of the present disclosure will appreciate how, in some embodiments, the components of the console information recording dongle device described herein (e.g., the console information recording engine and the storage device) may be integrated with a networking device while being provided with a dedicated power source, with those components configured to operate independently of an operating system (e.g., an NOS) in that networking device so that the console information recording operations may be performed during initialization of the networking device and prior to availability of that operating system, while remaining within the scope of the present disclosure.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A console information recording dongle system, comprising:

a networking device including a networking device console port that is configured to be coupled to a console server device via a cable; and a console information recording dongle device including:

a dongle device console connector that is directly connected to the networking device console port;

a storage device; and a console information recording engine that is coupled to the dongle device console connector and the storage device, wherein the console information recording engine is configured to:

receive, through the dongle device console connector via the networking device console port, console logs generated by the networking device during initialization of the networking device; and store the console information in the storage device.

2. The system of claim 1, wherein the networking device includes a networking device power port, the console information recording dongle device includes a dongle device power connector that is connected to the networking device power port and the console information recording engine, and the console information recording engine is configured to:

operate using power received through the dongle device power port via the networking device power port on the networking device.

3. The system of claim 1, wherein the console information recording dongle device defines a storage device slot, and includes a storage device connector that is located adjacent to the storage device slot and that is coupled to the console information recording engine, and wherein the storage device connector is configured to:

engage the storage device when the storage device is moved into the storage device slot to couple the storage device to the console information recording engine.

4. The system of claim 1, wherein the console information recording dongle device includes a dongle device console port that is coupled to the console information recording engine, and wherein the console information recording engine is configured to:

transmit, via the dongle device console port, the console logs that were received via the dongle device console connector.

5. The system of claim 4, wherein the console information recording engine is configured to:

receive, via the dongle device console port, networking device information; and transmit, through the networking device console port via the dongle device console connector, the networking device information to the networking device.

6. The system of claim 4, wherein the console information recording engine is configured to:

receive, via the dongle device console port, a console configuration instruction; and configure, in response to receiving the console configuration instruction, a console connection between the networking device console port and the dongle device console connector.

7. An Information Handling System (IHS), comprising:

a dongle chassis;

a dongle device console connector that is included on the dongle chassis and that is configured to directly connect to a networking device console port that is configured to be coupled to a console server device via a cable;

a storage device connector that is included on the dongle chassis and that is configured to connect to a storage device;

a processing system that is housed in the dongle chassis and that is coupled to the dongle device console connector and the storage device connector; and a memory system that is coupled to the processing system and that includes instructions that, when executed by the processing system, cause the processing system to provide a console information recording engine that is configured to:

receive, via the dongle device console connector, console logs generated by a networking device during initialization of the networking device when the dongle device console connector is connected to the networking device console port; and store the console information in a storage device that is connected to the storage device connector.

8. The IHS of claim 7, further comprising:

a dongle device power connector that is included on the dongle chassis, that is coupled to the processing system, and that is configured to connect to a networking device power port, wherein the console information recording engine is configured to:

operate using power received through the dongle device power port via the networking device power port when the dongle device power connector is connected to the networking device power port.

9. The IHS of claim 7, further comprising:

a storage device slot defined on the dongle chassis; and a storage device connector that is included on the dongle chassis adjacent to the storage device slot and that is configured to:

engage the storage device when the storage device is moved into the storage device slot to couple the storage device to the processing system.

10. The IHS of claim 7, further comprising:

a dongle device console port that is included on the dongle chassis and that is coupled to the processing system, wherein the console information recording engine is configured to:

transmit, via the dongle device console port, the console logs that were received via the dongle device console connector.

11. The IHS of claim 10, wherein the console information recording engine is configured to:

receive, via the dongle device console port, networking device information; and transmit, through the networking device console port via the dongle device console connector, the networking device information to a networking device when the dongle device console connector is connected to the networking device console port that is included on that networking device.

12. The IHS of claim 10, wherein the console information recording engine is configured to:

receive, via the dongle device console port, a console configuration instruction; and configure, in response to receiving the console configuration instruction, a console connection between the networking device console port and the dongle device console connector when the dongle device console connector is connected to the networking device console port.

13. The IHS of claim 7, wherein the dongle device console connector is a Registered Jack 45 (RJ-45) type connector, and the storage device connector is a Micro Secure Digital (MicroSD) card.

14. A method for recording console information from a computing device using a dongle device, comprising:

directly connecting, by a dongle device console connector on a console information recording dongle device, to a networking device console port on a networking device that is configured to be coupled to a console server device via a cable;

receiving, by the console information recording dongle device through the dongle device console connector via the networking device console port, console logs generated by the networking device during initialization of the networking device; and storing, by the console information recording dongle device in a storage device that is included in the console information recording dongle device, the console information.

15. The method of claim 14, further comprising:

connecting, by a dongle device power connector on the console information recording dongle device, to a networking device power port on the networking device;

receiving, by the console information recording dongle device through the dongle device power connector via the networking device power port, power provided by the networking device; and operating, by the console information recording dongle device, using the power.

16. The method of claim 14, further comprising:

engaging, by a storage device connector on the console information recording dongle device when the storage device is moved through a storage device slot defined by the console information recording dongle device, the storage device.

17. The method of claim 14, further comprising:

transmitting, by the console information recording dongle device via a dongle device console port included on the console information recording dongle device, the console logs that were received via the dongle device console connector.

18. The method of claim 17, further comprising:

receiving, by the console information recording dongle device via the dongle device console port, networking device information; and transmitting, by the console information recording dongle device through the networking device console port via the dongle device console connector, the networking device information to the networking device.

19. The method of claim 17, further comprising:

receiving, by the console information recording dongle device via the dongle device console port, a console configuration instruction; and configuring, by the console information recording dongle device in response to receiving the console configuration instruction, a console connection between the networking device console port and the dongle device console connector.

20. The method of claim 14, wherein the dongle device console connector is a Registered Jack 45 (RJ-45) type connector, and the storage device connector is a Micro Secure Digital (MicroSD) card.

* * * * *